US012808179B2

(12) United States Patent
Luscombe et al.

(10) Patent No.: US 12,808,179 B2
(45) Date of Patent: Nov. 24, 2026

(54) MODULAR FRAMING SYSTEM

(71) Applicant: POLYPLAS INTERNATIONAL PTY LTD, Rowville (AU)

(72) Inventors: Peter Luscombe, Rowville (AU); Daryl Wong, Rowville (AU)

( * ) Notice: Subject to any disclaimer, the term of this patent is extended or adjusted under 35 U.S.C. 154(b) by 385 days.

(21) Appl. No.: 18/278,853

(22) PCT Filed: Feb. 28, 2022

(86) PCT No.: PCT/AU2022/050160

§ 371 (c)(1),
(2) Date: Aug. 25, 2023

(87) PCT Pub. No.: WO2022/178596

PCT Pub. Date: Sep. 1, 2022

(65) Prior Publication Data

US 2024/0151024 A1 May 9, 2024

(30) Foreign Application Priority Data

Feb. 26, 2021 (AU) ................................ 2021900523
Apr. 29, 2021 (AU) ................................ 2021901267

(51) Int. Cl.
*E04B 1/24* (2006.01)
*F16B 7/18* (2006.01)
*F16M 11/22* (2006.01)

(52) U.S. Cl.
CPC ............ *E04B 1/2403* (2013.01); *F16B 7/185* (2013.01); *F16M 11/22* (2013.01); (Continued)

(58) Field of Classification Search
CPC ..... F16M 11/22; F16M 2200/08; F16B 7/185; F16B 7/18; F16B 2200/67; E04B 1/2403; (Continued)

(56) References Cited

U.S. PATENT DOCUMENTS 1,419,608 A * 6/1922 Brendza .................. E06B 3/984 403/231
3,914,063 A * 10/1975 Papayoti ............... E04B 1/1903 403/171

(Continued)

FOREIGN PATENT DOCUMENTS

FR 2279021 A1 2/1976
GB 696224 8/1953

(Continued)

OTHER PUBLICATIONS

Extended European Search Report received for European Patent Application No. 22758649.2, mailed on Jan. 14, 2025, pp. 9.

(Continued)

*Primary Examiner* — Patrick D Hawn
(74) *Attorney, Agent, or Firm* — Harmohinder S. Bedi

(57) ABSTRACT

A modular framing system has a plurality of spanning members, at least some of which are hollow and have a predetermined nominal wall thickness, fasteners, and a plurality of joiners that are each securable to two or more of the hollow spanning members. Each joiner has connection portions, and at least one web portion that interconnects an adjacent pair of the connection portions, and has a minimum thickness that is greater than the predetermined nominal wall thickness of the hollow spanning members. Each connection portion has through holes for fasteners to secure the joiner to spanning members. The web portion spaces the respective adjacent pair of connection portions, and spanning members secured to the adjacent pair of connection portions are non-parallel and lie in a common plane.

18 Claims, 29 Drawing Sheets

(52) U.S. Cl.
CPC ................. *E04B 2001/2415* (2013.01); *E04B 2001/2421* (2013.01); *E04B 2001/2451* (2013.01); *E04B 2001/2463* (2013.01); *F16M 2200/08* (2013.01)

(58) Field of Classification Search
CPC .. E04B 1/19; E04B 1/1903; E04B 2001/2415; E04B 2001/2421; E04B 2001/2451; E04B 2001/2463; E04B 2001/1933; E04B 2001/1984; E04B 2001/1918; E04B 2001/1963; E04B 2001/389
See application file for complete search history.

(56) References Cited

U.S. PATENT DOCUMENTS

| | | | | |
|---|---|---|---|---|
| 4,070,847 | A | 1/1978 | Madl, Jr. | |
| 4,211,044 | A * | 7/1980 | Gugliotta | E04B 1/19 52/654.1 |
| 4,325,648 | A * | 4/1982 | De Bliquy | E04B 1/585 403/218 |
| 4,449,843 | A * | 5/1984 | Wendel | E04B 1/1903 52/81.3 |
| 4,589,157 | A * | 5/1986 | Richard | E01D 2/00 14/73 |
| 4,593,514 | A * | 6/1986 | Smith | E04B 1/19 403/171 |
| 4,765,114 | A * | 8/1988 | Wesselski | B64G 99/00 52/646 |
| 4,939,882 | A * | 7/1990 | Filip | E04B 1/1903 52/646 |
| 5,214,899 | A * | 6/1993 | Beeche | E04B 1/19 52/648.1 |
| 5,685,662 | A | 11/1997 | Rollin et al. | |
| 5,704,185 | A * | 1/1998 | Lindsay | E04C 3/291 403/219 |
| 6,694,700 | B1 * | 2/2004 | Mackett | E04B 1/0046 411/404 |
| 7,530,201 | B2 * | 5/2009 | Reynolds | E04B 1/19 52/81.3 |
| 9,376,797 | B2 * | 6/2016 | Yang | E04B 1/2403 |
| 9,702,389 | B2 * | 7/2017 | Oetlinger | F16B 7/18 |
| D827,416 | S * | 9/2018 | Macdonald | D8/349 |
| D834,920 | S * | 12/2018 | Macdonald | D25/124 |
| 10,273,678 | B2 * | 4/2019 | Hensen | E04B 1/2608 |
| 10,301,829 | B2 * | 5/2019 | Schneider | E04B 1/5806 |
| 10,316,508 | B1 | 6/2019 | Hendry | |
| 10,738,457 | B1 * | 8/2020 | Hendry | E04B 1/1903 |
| 10,941,583 | B2 * | 3/2021 | Staszczyk | E04H 9/024 |
| 11,078,665 | B2 * | 8/2021 | Daudet | E04B 2/766 |
| 11,725,378 | B2 * | 8/2023 | Adams | E04C 3/32 52/656.9 |
| D1,013,488 | S * | 2/2024 | Luscombe | D8/349 |
| 12,258,762 | B2 * | 3/2025 | Garrison | E04F 10/02 |
| 2007/0092330 | A1 * | 4/2007 | Zeilinger | F16B 7/18 403/231 |
| 2007/0201946 | A1 * | 8/2007 | Sammann | B25H 1/06 403/403 |
| 2013/0211795 | A1 * | 8/2013 | Vanker | E04B 1/08 703/1 |
| 2013/0259563 | A1 * | 10/2013 | Campbell | E04B 1/2604 403/188 |
| 2013/0272777 | A1 * | 10/2013 | Hayter | E06B 7/082 403/205 |
| 2014/0250821 | A1 * | 9/2014 | Strickland | E04C 3/08 52/636 |
| 2015/0033641 | A1 * | 2/2015 | Satoh | E04H 9/0237 52/741.1 |
| 2016/0251845 | A1 * | 9/2016 | Evans | E04B 1/388 52/698 |
| 2024/0342624 | A1 * | 10/2024 | Hafendorfer | A63H 33/108 |

FOREIGN PATENT DOCUMENTS

| | | | | |
|---|---|---|---|---|
| KR | 101761705 B1 | | 7/2017 | |
| KR | 20210077463 A | * | 6/2021 | E04C 3/34 |
| KR | 102471118 B1 | * | 11/2022 | F16B 7/18 |
| WO | WO-2010062084 A2 | * | 6/2010 | E04B 1/1903 |
| WO | WO-2021251664 A1 | * | 12/2021 | E04B 1/2403 |

OTHER PUBLICATIONS

"Mounting Brackets and Feet for 50 mm & 75 mm Rails", Thorlabs Inc., The Wayback Machine, available at "https://web.archive.org/web/20200925074616/https://www.thorlabs.com/newgrouppage9.cfm?objectgroup_id=13911", 2 pages.
"Makerbeam bracket 45 degree, 12 pcs", botnroll.com, The Wayback Machine, available at "https://web.archive.org/web/20170801000000*/https://www.botnroll.com/en/makerbeam/704-makerbeam-bracket-45-degree-12-pcs.html", 3 pages.
"5 Great Reasons to Build With T-Slot Aluminum", F&L Industrial Solutions Inc., The Wayback Machine, available at "https://web.archive.org/web/20170801000000*/https://fandl8020.com/5-great-reasons-build-t-slot-aluminum/", 4 pages.
International Search Report and Written Opinion mailed on May 9, 2022, for International Application No. PCT/AU2022/050160 filed on Feb. 28, 2022, 9 pages.

* cited by examiner

MODULAR FRAMING SYSTEM

RELATED APPLICATION

This application is a U.S. National Stage Application of International Application No. PCT/AU2022/050160 filed on Feb. 28, 2022 which further claims priority from Australian Patent Applications having Ser. No. 20/219,01267 and 2021900523 respectively filed on Apr. 29, 2021 and Feb. 26, 2021 which is incorporated herein by reference for all purpose.

FIELD OF THE INVENTION

The present invention relates to a modular framing system, and to components for use in a modular framing assembly.

BACKGROUND

Modular frame structures are used in many industrial situations for a wide variety of applications. These applications include structures for supporting utility/service components (such as plant equipment), workstations, machine guards, gantries, enclosures, and the like.

Each modular frame system employs a set of joining components and spanning member that are interconnectable with the joining components to form the structure. The modular aspect of the system enables the construction of a structure that is most appropriate for the application, with the constraints on the construction including a working load limit that is determined by the modular frame system proprietor, and the geometric characteristics of the system components. Many modular frame systems are limited by relatively low working load limits.

In some support applications, there is a need for high structural strength and durability. By way of example, some utility/service components are required to able to survive seismic events up to a predetermined intensity, and continue operation after that event has passed. This requirement places strength and durability requirements on the supporting structures.

Where high structural strength and durability are a relevant factor for support applications, it is known to engineer and fabricate bespoke support structures. This type of structure is complex and expensive, and often has complexities for installation.

There is a need to address the above, and/or at least provide a useful alternative.

SUMMARY

There is provided a modular framing system comprising:

a plurality of spanning members, at least some of which are hollow and have a predetermined nominal wall thickness;

fasteners; and a plurality of joiners that are each securable to two or more of the hollow spanning members, each joiner having:

two or more connection portions, each connection portion having two or more through holes through which to pass one of the fasteners when securing the joiner to one of the spanning members, at least one web portion that interconnects an adjacent pair of the connection portions, the web portion being configured to space the respective adjacent pair of connection portions, and such that spanning members secured to the adjacent pair of connection portions are non-parallel and lie in a common plane, and a minimum thickness that is greater than the predetermined nominal wall thickness of the hollow spanning members, wherein frame structures are assemblable from the modular framing system, each frame structure being formed of spanning members that are interconnected by securing the joiners to the spanning members, with each fastener passing through a respective one of the through holes in the connection portions of one of the joiners and engaging the respective spanning member to thereby form the interconnection, and with the joiners interconnected with connection portions against a lateral external surfaces of the spanning members in an assembled frame structure.

In assembled frame structures, each interconnection of two or more spanning members defines a notional node point. Preferably, each joiner has a first major edge and a second major edge, the first major edge being shaped to complement at least part of the cross-sectional profile of one of the spanning members. More preferably, each joiner is shaped to accommodate one of the spanning members extending through the notional node point in three non-parallel directions in assembled frame structures. Alternatively or additionally, the first major edge is a non-planar surface that has two or more sections in which normals to the surface are convergent.

Each spanning member preferably has two opposing ends, and defines a length direction that extends between the opposing ends, and also has a substantially similar cross-sectional profile in planes that are transverse to the length direction. In at least some embodiments, the spanning members are linear in the length direction. Preferably, the external surface of the spanning members is non-cylindrical. Preferably, the spanning members are hollow and have an internal cavity. More preferably, the spanning members have generally square cross-sectional profile.

Alternatively or additionally, the first major edge includes a locating portion that is shaped to complement at least a segment of the cross-sectional profile of the spanning members.

Preferably, each of the joiners is formed such that each web portion interposes an adjacent pair of the connection portions, and wherein each connection portion in that pair is contiguous with the respective web portion.

In certain instances, each connection portion that is part of a pair of connection portions that are contiguous with an interposing web portion defines a planar mounting face, and the planar mounting faces in that pair of connection portions are co-planar. In such instances, the interposing web portion can have a substantially planar surface, and the joiner can be formed such that, for each pair of connection portions and the corresponding interposing web portion, the planar mounting faces and the substantially planar surface all lie in a common plane.

In some other instances, each connection portion that is part of a pair of connection portions that are contiguous with an interposing web portion defines a planar mounting face, and the joiner is shaped such that the planar mounting faces in that pair of connection portions are disposed in non-parallel planes. In such instances, the interposing web portion can be arcuate.

In some embodiments of the system, the plurality of joiners includes a set of first joiners, that each have two connection portions and one web portion, whereby, in assembled frame structures that incorporate a respective one of the first joiners, spanning members secured to the respective first joiner project outwardly away from the respective first joiner in up to two directions. At least some of the first joiners consist only of two connection portions and one web portion.

The plurality of joiners can alternatively or additionally includes a set of second joiners, that each have three connection portions and two web portions, whereby, in assembled frame structures that incorporate a respective one of the second joiners, spanning members secured to the respective second joiner project outwardly away from the respective second joiner in up to three directions. At least some of the second joiners consist only of three connection portions and two web portions.

The locating portion of the first major edge of each of the second joiners can include a concave recess that is shaped to receive the cross-sectional profile of the spanning members. Preferably, the second joiners are configured such that, in assembled frame structures a respective one of the second joiners, two spanning members secured to two of the three connection portions project outwardly away from the respective second joiner in substantially parallel and co-axial directions. Even more preferably, the second joiners are configured such that, in assembled frame structures that incorporate a respective one of the second joiners, three spanning members that are secured to the three connection portions are substantially co-planar.

The plurality of joiners can alternatively or additionally includes a set of third joiners, that each have four connection portions and four web portions, whereby, in assembled frame structures that incorporate a respective one of the third joiners, spanning members secured to the respective third joiner project outwardly away from the respective third joiner in up to four directions. At least some of the third joiners consist only of four connection portions and four web portions.

Preferably, the third joiners have a generally annular shape, and the first major edge defines the inwardly facing edge of that annular shape.

Preferably, the locating portion of the first major edge in each joiner of the first set includes two planar segments with the two normals to those two planar segments being convergent.

Preferably, the locating portion of the first major edge in each joiner of the second set includes three planar segments with the three normals to those three planar segments being convergent.

Preferably, the locating portion of the first major edge in each joiner of the third set includes four planar segments with the four normals to those four planar segments being convergent.

Joiners of the modular framing system can be formed such that each connection portion has a normal plane that is orthogonal to the respective planar mounting face and is coincident with the through holes of the respective connection portion, wherein the normal planes intersect the notional node point of the joiner.

Certain joiners can be formed such that all normal planes of the connection portions additionally intersect along a straight line that is coincident with the notional node point.

In some embodiments, the web portions of at least some of the joiners include a mounting hole, wherein the modular framing system further comprises one or more cross-braces, and wherein, in assembled frame structures that incorporate a respective one of the cross-braces, end regions of the respective cross-brace are mounted to a pair of joiners via the mounting holes.

Each joiner can be configured such that each cross-brace is to project away from the respective joiner at an oblique angle to spanning members that are secured to the respective joiner. In some examples, the mounting of an end region of a respective one of the cross-braces to a respective joiner facilitates adjustment of the position of the respective end of the cross-brace relative to the mounting hole. In some alternative examples, the cross-brace includes an adjuster with which to adjust the effective length.

The cross-braces can include any of threaded rod, a channel strut, cable, wire.

At least some of the joiners are each formed of material having a constant thickness. Preferably, each spanning member has a predetermined nominal wall thickness, and minimum thickness of the joiners is greater than the predetermined nominal wall thickness. More preferably, the ratio of the minimum thickness of the joiners to the predetermined nominal wall thickness is at least 1.5:1. Even more preferably, the ratio of the minimum thickness of the joiners to the predetermined nominal wall thickness is in the range of 1.75:1 to 2.25:1.

In some examples, some or all of the joiners have a plate-like formation. In some other examples, some or all of the joiners are formed by folding plate material.

The modular framing system can further comprise a plurality of feet for connecting frame structures assembled from the system to a supporting structure, wherein each foot includes:

a base plate with a primary face that is to face towards the supporting structure to which that foot is connected, and a mating portion that is attached to the base plate on the opposing face of the base plate to the primary face, wherein the mating portion is configured to mate with an end portion of one of the spanning members, such that the mated spanning member projects away from the base plate in a direction that is substantially opposite to the primary face.

In at least some embodiments, the mating portion includes one or more through holes through which to pass a fastener to secure the foot and mated spanning member to one another.

In some embodiments, the mating portion is a sleeve formation that is shaped to receive an end portion of one of the spanning members. Each foot can further comprise one or more gussets that are each attached to the external surface of the sleeve formation and the opposing face of the base plate.

Preferably, the base plate includes one or more mounting holes for use in connecting the respective foot to the support structure.

The modular framing system can further comprise a plurality of angle connection brackets that each have:

two connection portions, each connection portion having one or more through holes through which to pass a fastener to secure the joiner to one of the spanning members and defining a planar mounting face, and an intermediate portion that interconnects the two connection portions, the intermediate portion being shaped such that the planar mounting faces in that pair of connection portions are disposed in non-parallel planes.

In some examples, the intermediate portion of respective angle connection brackets are shaped such that the planar mounting faces in that pair of connection portions are disposed in perpendicular planes. In some alternative or additional angles, the intermediate portion of respective angle connection brackets are shaped such that the planar mounting faces in that pair of connection portions are disposed in oblique planes.

In some other examples, the intermediate portion can include a bridging section that includes a mount to which a cross-brace is mountable in assembled frame structures that incorporate the respective angle bracket. Preferably, the bridging section extends obliquely to the planar mounting faces of the respective angle connection bracket.

The modular framing system can further comprise a plurality of packing spacers, wherein, in assembled frame structures, one or more packing spacers can be installed between one of the joiners and one of the spanning members.

The modular framing system can further comprise a plurality of mounting shoes that each include:

a saddle having a pair of lateral wall portions and a support wall portion that is interconnected with the pair of lateral walls to extend therebetween, and one or more wings that each project from the saddle portion, wherein the saddle and wings have through holes, and wherein a first one of the spanning members is securable to the wings of the respective mounting shoe by fasteners passing through the respective through holes and engaging with the first spanning member, an end portion of a second one of the spanning members is receivable within the saddle between the lateral wall portions, and is securable to the saddle of the respective mounting shoe by fasteners passing through the respective through holes and engaging with the second spanning member.

Preferably, at least some of the mounting shoes each have a pair of wings, wherein each of the pair of wings projects from a respective lateral wall of the saddle.

The modular framing system can further comprise a plurality of couplers that each include:

a hub portion, and two or more tongue portions that are interconnected with one another by the hub portion, wherein each tongue portion:

projects outwardly from the hub portion, includes one or more connection holes that extend into or through the tongue portion, and is shaped to be received in the internal cavity of one of the spanning members through an opening at the end of the respective spanning member, and wherein, in assembled frame structures that incorporate a respective one of the couplers, spanning members are secured to the respective coupler by fasteners passing through the respective spanning members and extending into or through the through holes in the respective tongue portions.

Preferably, each coupler further includes tines that project outwardly from the hub portion, each tine being adjacent one of the tongue portions and having one or more through holes, wherein:

passageways are formed by opposing faces of the tines and tongue portions, the walls of the spanning members being receivable in the passageways, through holes in the tongue portions and the adjacent tine or tines are axially aligned, and in assembled frame structures that incorporate a respective coupler, the respective fasteners also extend through the through holes in the tines.

The couplers can have two to six tongue portions. Preferably, each tongue portion of each coupler is aligned with one of three orthogonal axes that are centred on the respective hub portion.

In at least some embodiments, the fasteners have a shank with an external thread. In some embodiments, the through holes in the connection portions of the joiners have a clearance fit with respect to the thread diameter of the fasteners.

In some examples, the fasteners have a tip with a self-drilling formation, whereby the fasteners form holes in the spanning members during installation.

In some alternative examples, the fasteners are bolts. The spanning members may have holes formed in end region to mate with through holes in the connection portions of the joiners.

The modular frame system can additionally comprise a plurality of connectors for use in connecting a service component such that service component is supportable by a frame structure that is assembled from the system, wherein each connector has:

a first formation with one or more through holes through which to pass fasteners to secure the connector to a spanning member; and one or more second formations that are each for use in connecting directly or indirectly to the service component.

Preferably, the first formation is shaped to extend at least partially circumferentially around a spanning member. More preferably, the first formation has a general C-shaped form.

The second formation can be in the form of a tab formation that extends from and/or is integral with the first formation. The tab formation can have mounting holes through which to pass the shank of a fastener.

The second formation can alternatively or additionally included a threaded shank that projects outwardly from the first formation.

There is also provided a joiner for a modular framing system that includes hollow spanning members that have a predetermined nominal wall thickness, and fasteners, the joiner comprising:

two or more connection portions, each connection portion having two or more through holes through which to pass one of the fasteners when securing the joiner to one of the spanning members, at least one web portion that interconnects an adjacent pair of the connection portions, the web portion being configured to space the respective adjacent pair of connection portions, and such that spanning members secured to the adjacent pair of connection portions are non-parallel and lie in a common plane, and a minimum thickness that is greater than the predetermined nominal wall thickness of the hollow spanning members.

Preferably each connection portion has at least two through holes.

The connection portions of the joiner are preferably configured such that the intersection of the longitudinal directions of each of the two or more spanning members that are secured to the connection portions defines a notional node point.

Preferably, each joiner has a first major edge and a second major edge, the first major edge being shaped to accommodate one of the spanning members extending through the notional node point in at least two non-parallel directions in frame structures assembled using the joiner. More preferably, the first major edge of each joiner is shaped to accommodate one of the spanning members extending through the notional node point in three non-parallel directions. Alternatively or additionally, the locating portion of the first major edge is a non-planar surface that has two or more convergent normals.

In some embodiments, the locating portion of the first major edge includes two planar segments with the two normals to those two planar segments being convergent.

In some alternative embodiments, the locating portion of the first major edge includes three planar segments with the three normals to those three planar segments being convergent.

In some further alternative embodiments, the locating portion of the first major edge includes four planar segments with the four normals to those four planar segments being convergent.

Alternatively or additionally, the first major edge includes a locating portion that is shaped to complement at least a segment of the cross-sectional profile of the spanning members.

Preferably, the joiner is formed such that each web portion interposes an adjacent pair of the connection portions, and wherein each connection portion in that pair is contiguous with the respective web portion.

In certain instances, each connection portion that is part of a pair of connection portions that are contiguous with an interposing web portion defines a planar mounting face, and the planar mounting faces in that pair of connection portions are co-planar. In such instances, the interposing web portion can have a substantially planar surface, and the joiner can be formed such that, for each pair of connection portions and the corresponding interposing web portion, the planar mounting faces and the substantially planar surface all lie in a common plane.

In some other instances, each connection portion that is part of a pair of connection portions that are contiguous with an interposing web portion defines a planar mounting face, and the joiner is shaped such that the planar mounting faces in that pair of connection portions are disposed in non-parallel planes. In such instances, the interposing web portion can be arcuate.

In some embodiments, the joiner has two connection portions and one web portion, whereby spanning members secured to the joiner project outwardly away from the joiner in up to two directions. The joiner can consist only of two connection portions and one web portion.

In some other embodiments, the joiner has three connection portions and two web portions, whereby spanning members secured to the joiner project outwardly away from the respective second joiner in up to three directions. The locating portion of the first major edge of the joiner can include a concave recess that is shaped to receive the cross-sectional profile of the spanning members.

The joiner can consist only of three connection portions and two web portions. Preferably, the joiner is configured such that two spanning members secured to two of the three connection portions project outwardly away from the joiner in substantially parallel and co-axial directions. Even more preferably, the joiner is configured such that three spanning members that are secured to the three connection portions are substantially co-planar.

In some embodiments, the joiner has four connection portions and four web portions, whereby spanning members secured to the joiner project outwardly away from the joiner in up to four directions. The joiner can consist only of four connection portions and four web portions. In such embodiments, the joiner can have a generally annular shape, and the first major edge defines the inwardly facing edge of that annular shape.

Preferably, each connection portion has at least two through holes.

The joiner can be formed such that each connection portion has a normal plane that is orthogonal to the respective planar mounting face and is coincident with the through holes of the respective connection portion, and wherein the normal planes intersect the notional node point of the joiner.

The joiner can be formed such that all normal planes of the connection portions additionally intersect along a straight line that is coincident with the notional node point.

In some embodiments, each web portion of the joiner includes a mounting hole for use in mounting a cross-brace to the joiner.

BRIEF DESCRIPTION OF THE DRAWINGS

In order that the invention may be more easily understood, embodiments will now be described, by way of examples only, with reference to the accompanying drawings, in which.

DETAILED DESCRIPTION

Figure 1:
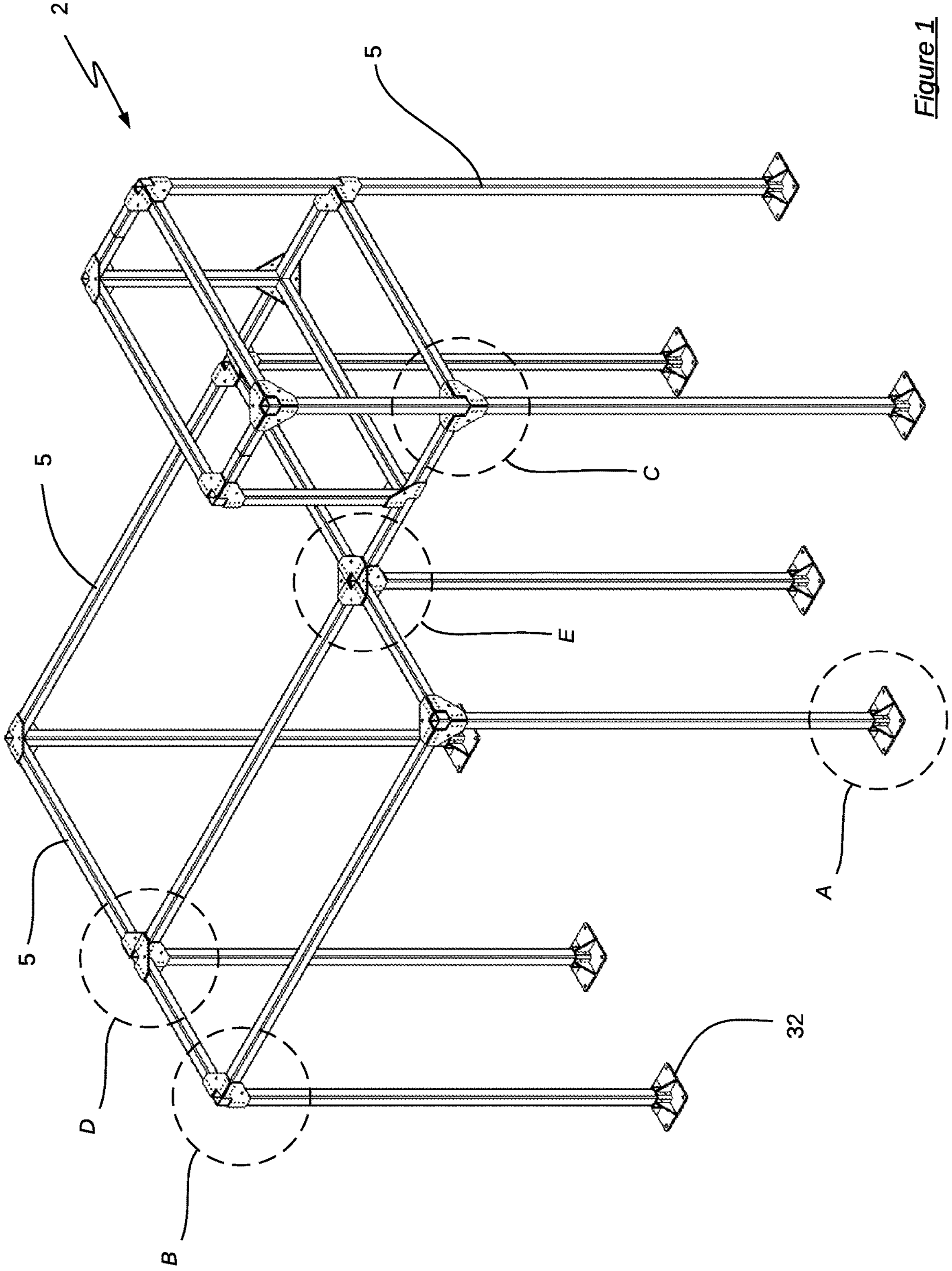
FIG. 1: is a perspective view of an illustrative structure constructed from components of a modular frame system according to a first embodiment of the present invention.
Figure 2A:
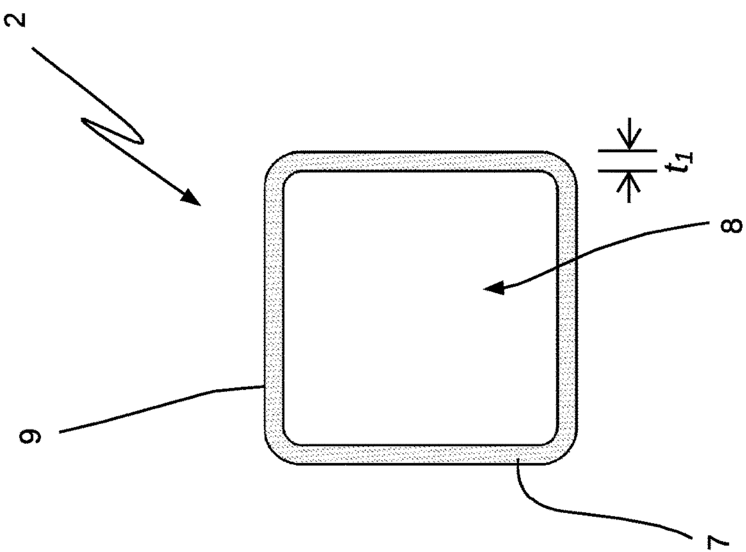
FIG. 2*a*: is an end view of the spanning member of FIG. 2.
Figure 2:
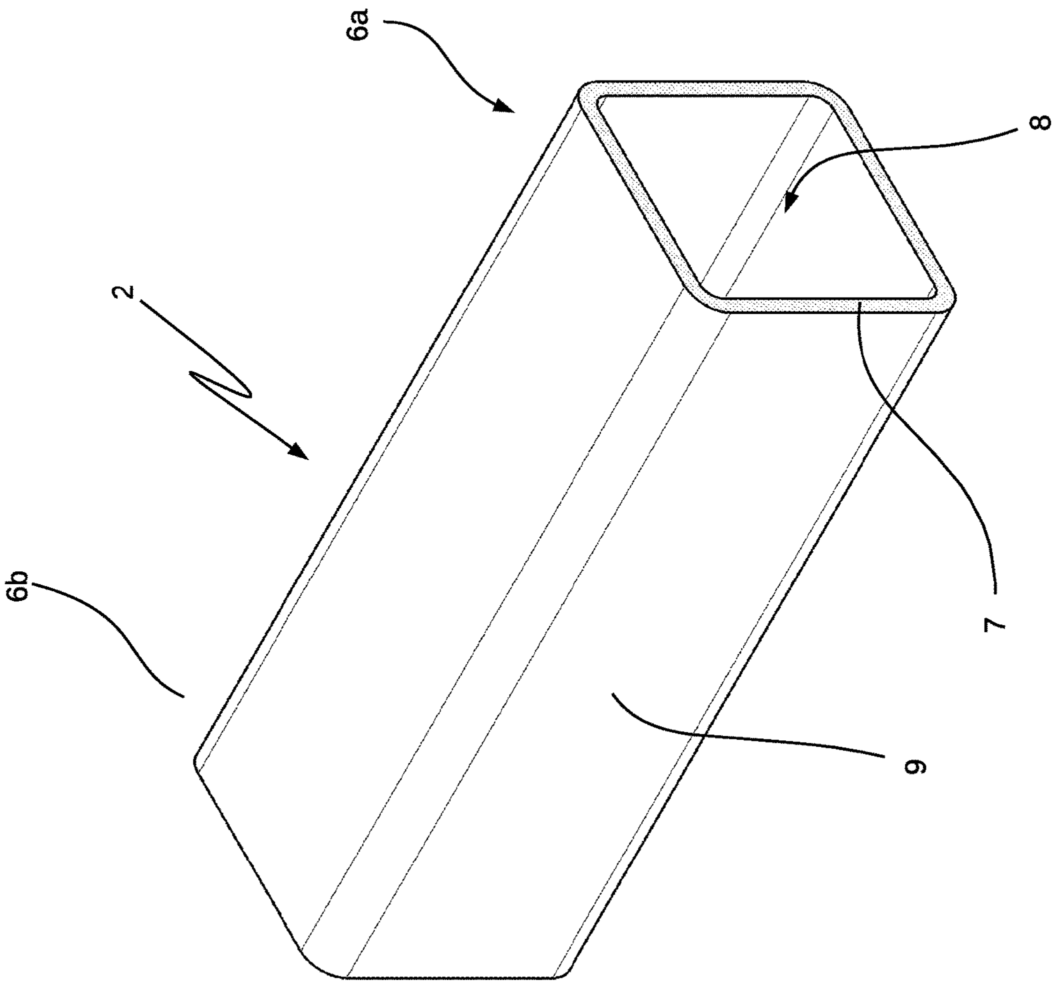
FIG. 2: is a perspective view of a spanning member of the system shown in FIG. 1.

FIG. 1 shows an illustrative structure 2 that is assembled from a modular frame system according to one embodiment. The frame system includes spanning members 5, joiners 10, feet 32, and fasteners that secure the other components of the system to one another in assembled frame structures, such as structure 2. FIGS. 2 and 2*a* illustrate a spanning member 5 that is used in the structure 2. FIGS. 3 to 6 show the joiner 10 of the modular frame system that are used in the structure 2. FIGS. 7 to 21 are enlarged views of various parts of the structure 2.

As will be apparent from FIG. 1, the spanning members 5 form links within the structure 2, and the spanning members 5 are interconnected via the joiners 10 and fasteners at the nodes of the structure 2.

Frame structures assembled from the modular frame system are suitable for supporting plant, equipment, service components and the like. Typically, frame structures used for these purposes are secured to a building, internally or externally, and/or on a foundation. Further, frame structures assembled from the modular frame system are suitable for supporting both dead loads (in other words, static loads that are applied to the frame structure by gravity acting on a supported component), and dynamic loads (including lateral forces that applied to the frame structure itself or by movement of a supported object, and transient vertical forces). As will be appreciated by those skilled in the art, dynamic loads can be induced by environmental events (such as wind loads, ground borne vibrations and impulses, and seismic activity), or by movement of a supported object (such as torque loads, vibrations, etc. that are generated by the supported object).

In this particular embodiment, each spanning member 5 has two opposing ends 6*a*, 6*b*, and defines a length direction E that extends between the opposing ends 6*a*, 6*b* that each have an end face 7.

For simplicity in this example, the spanning members 5 are linear in the length direction E However, it will be appreciated that in some instances, it may be desirable or necessary for some or all of the spanning members in a system to be non-linear in the length direction. Further, each spanning member 5 has a substantially similar cross-sectional profile in planes that are transverse to the length direction E As indicated in FIGS. 2 and 2*a*, the external outer surface 9 of the spanning members 5 is non-cylindrical, and the spanning members are hollow and have an internal cavity 8. As will be recognised by those skilled in the art, the spanning member 5 of FIG. 2 has the cross section of a square steel tube section. However, it will appreciated that in some instances, it may be desirable or necessary for some or all of the spanning members in a system to have alternative cross sections.

The end face 7 at each end 6*a*, 5*b* is in a plane that is transverse to the length direction E of the respective spanning member 5. As shown in FIG. 2*a*, the spanning members 5 have a predetermined nominal wall thickness t1.

Figure 4:
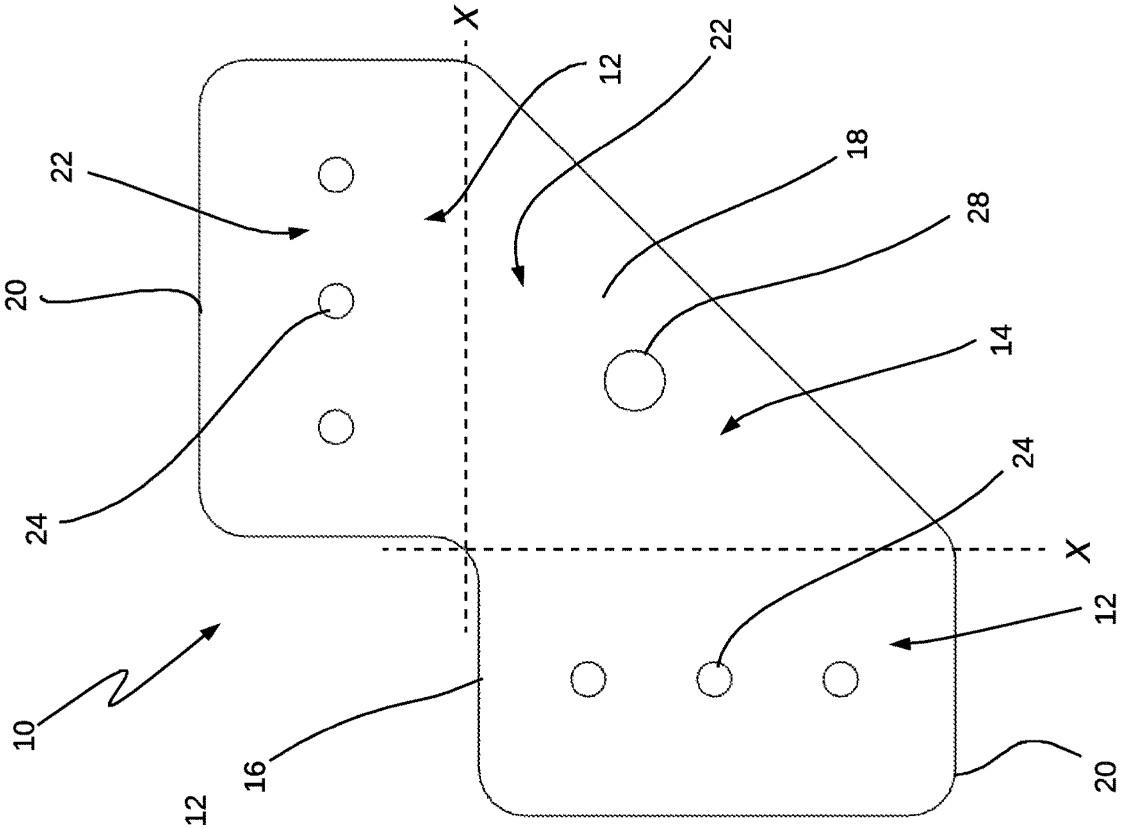
FIG. 4: is a plan view of the first joiner of FIG. 3.
Figure 3:
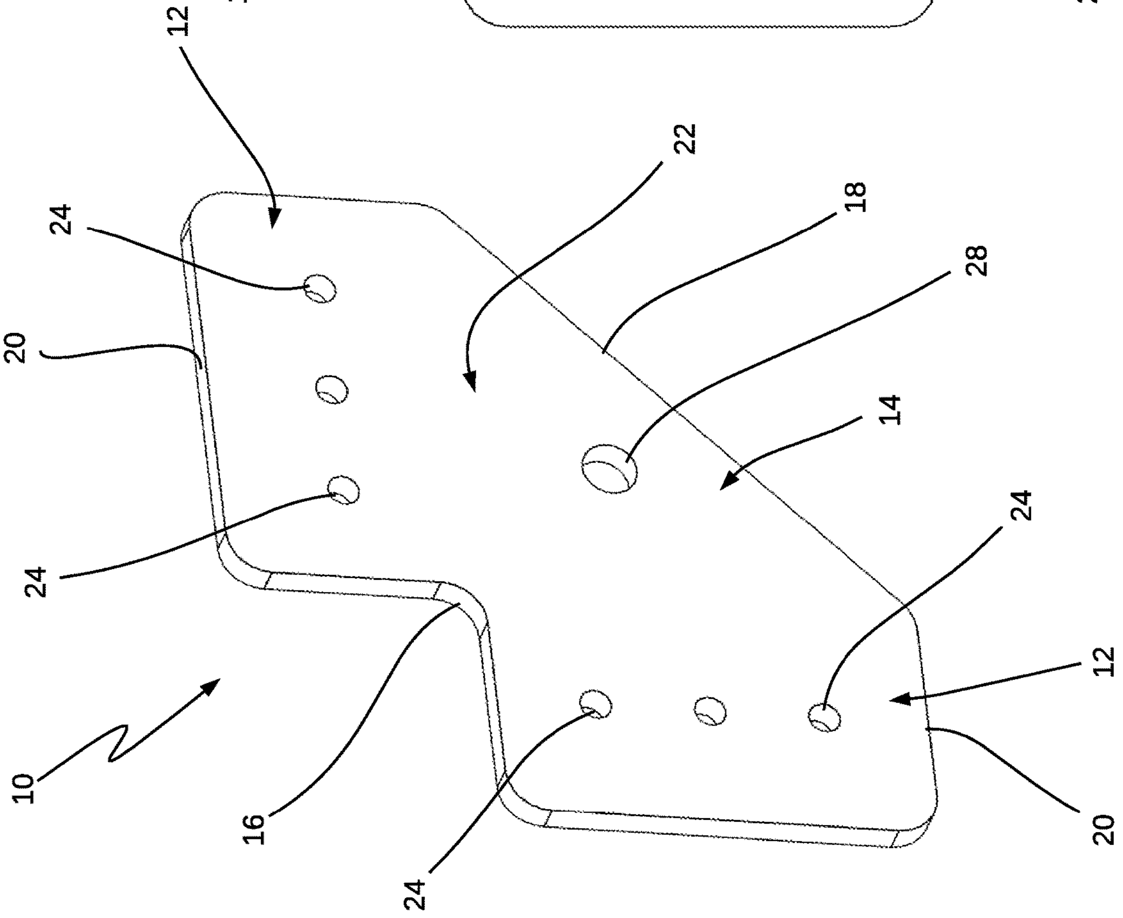
FIG. 3: is a perspective view of a first joiner of the system shown in FIG. 1.

FIGS. 3 and 4 show a joiner 10 of the system that is used in the structure 2. The first joiner 10 has two connection portions 12, and a web portion 14 that interconnects the adjacent pair of connection portions 12. Further, the web portion 14 spaces the adjacent pair of connection portions

12. The web portion 14 interposes the pair of the connection portions 12. Each connection portion 12 is contiguous with the web portion 14.

The two connection portions 12 are contiguous with the web portion 14. In other words, the joiner 10 is of unitary construction. As such the delineation into the connection portions 12 and web portion 14 arise from the function of the parts of the joiner 10 (described below in further detail), and are functional/notional, rather than structural. In FIG. 4, two dashed lines X indicate the boundaries of the connection portions 12 and web portion 14.

The joiner 10 has a first major edge 16, and a second major edge 18. As discussed in further detail below, the first major edge 16 has a locating portion that is shaped to complement at least part of the cross-sectional profile of one of the spanning members 5. In other words, the locating portion of the first major edge 16 is shaped to complement at least a segment of the cross-sectional shape of the external outer surface 9 in directions transverse to the length direction E of the spanning members. Two minor lateral edges 20 each extend between the first and second major edges 16, 18.

The joiner 10 of this embodiment has a plate-like formation. As will be apparent particularly from FIG. 3, the joiner 10 has two major faces 22 (one of which is shown in FIGS. 3 and 4) that are planar and parallel to one another.

In this example, the first major edge 16 of the joiner 10 is shaped to substantially complement two adjacent planar faces of the external outer surface 9 and the chamfer that interposes the two adjacent planar faces of the spanning member 5, when the spanning member is arranged with the length direction E being normal to the two planar major faces 22. The first major edge 16 includes a fillet that has a radius that is greater than the chamfers of external outer surface 9.

Each connection portion 12 of the joiner 10 has through holes 24 through which to pass one of the fasteners to secure the joiner 10 to one of the spanning members 5. In the example of FIGS. 3 and 4, each of the connection portions 12 of the joiner 10 has three through holes 24. It will be appreciated that having at least two through holes 24 in each connection portion 12 has the benefit of accommodating two fasteners in securing the joiner to the respective spanning member 5, which restrains that spanning member 5 from relative rotation. Additional through holes 24 in each connection portion 12 can be beneficial for providing increased shear resistance in the connection between the components, which may be required in some instances. Further, it may be desirable for the joiners to accommodate different fastener sizes.

Figure 6:
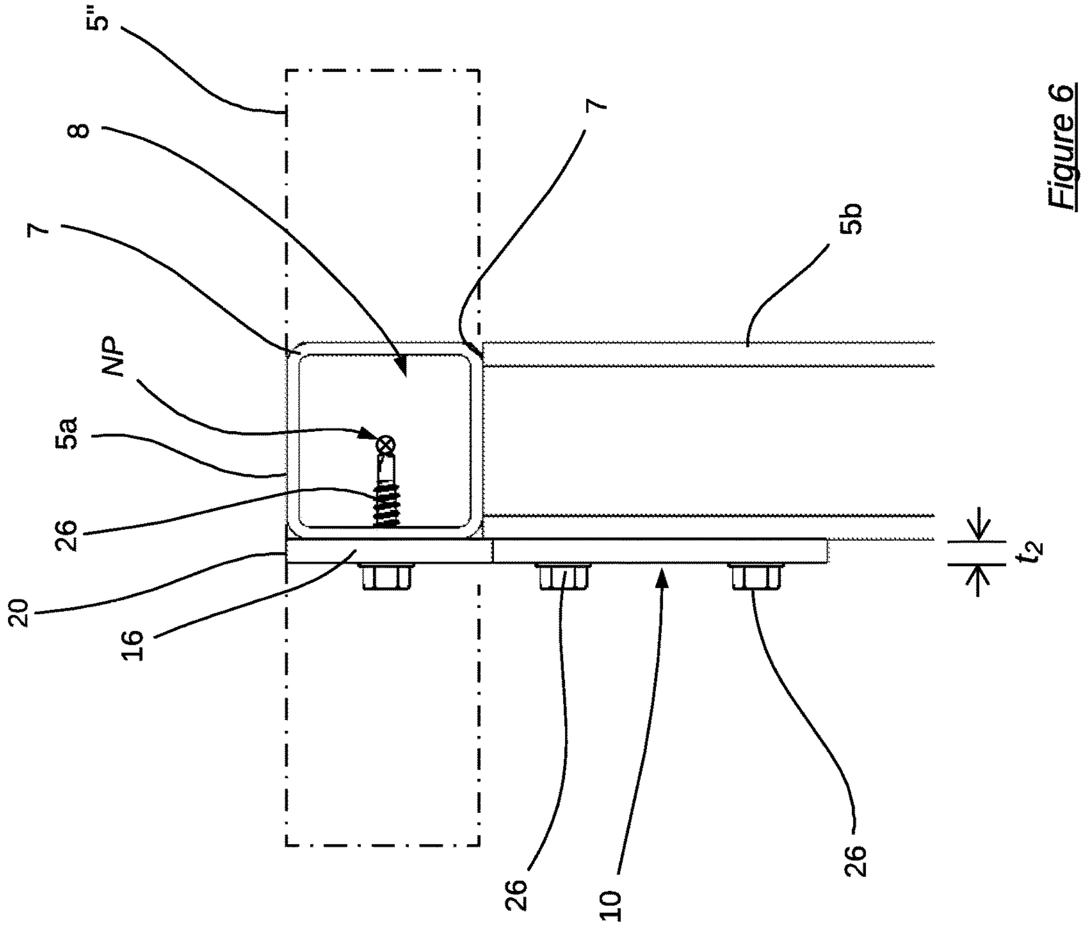
FIG. 6: is a top view of the schematic interconnection of FIG. 5.
Figure 5:
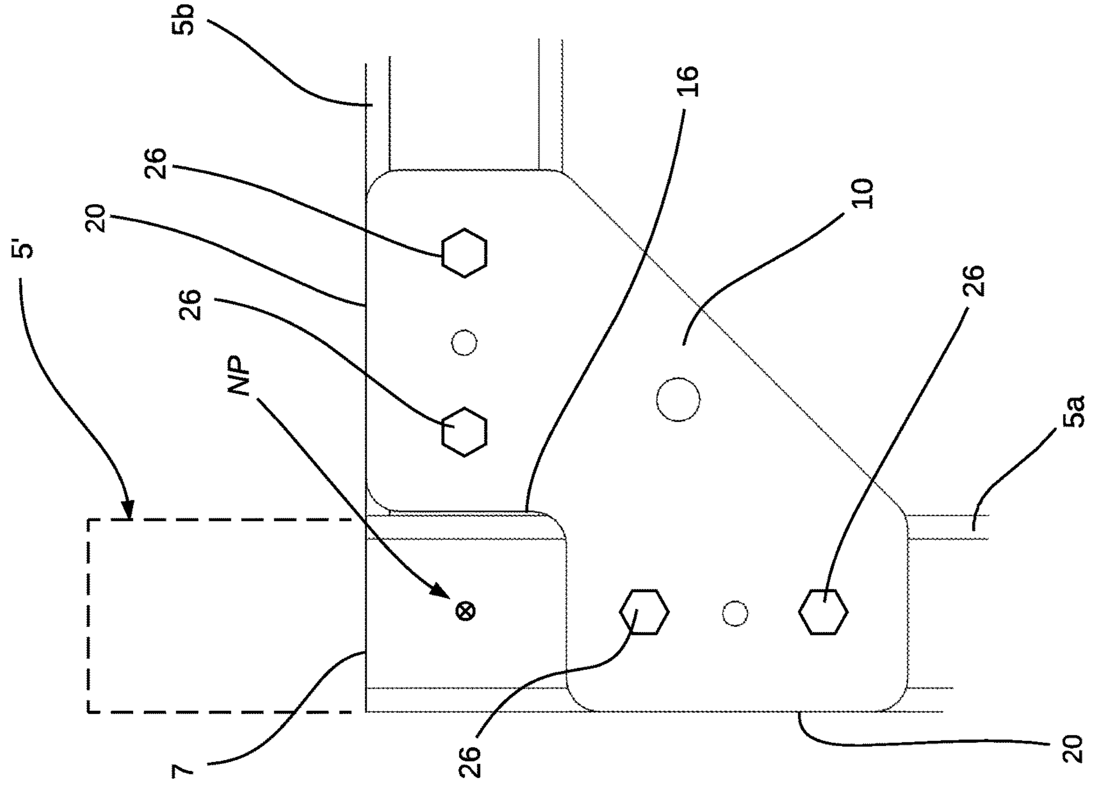
FIG. 5: is a left side elevation of an example interconnection between two spanning members of FIG. 2, and the first joiner of FIG. 3.
Figure 7:
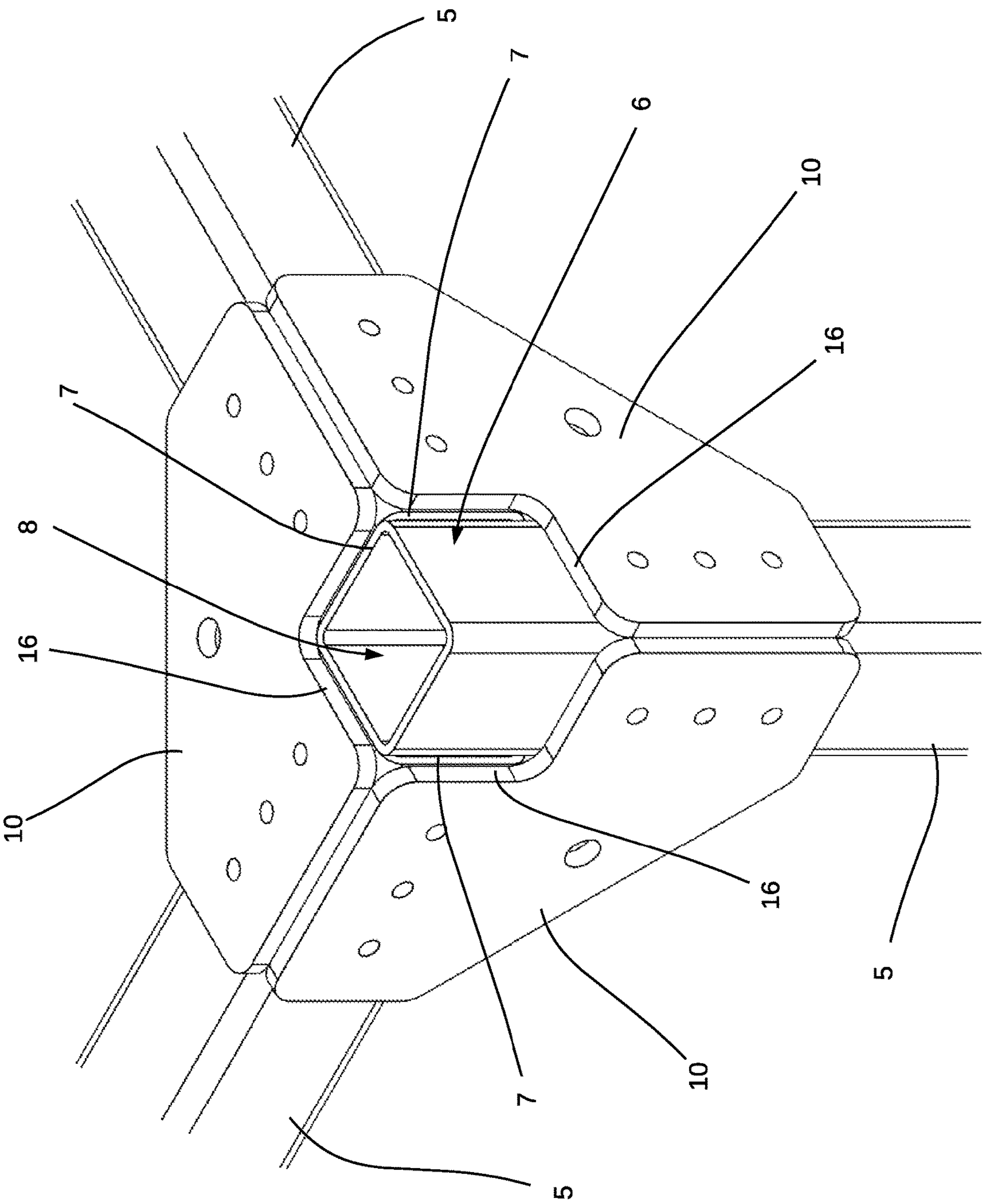
FIG. 7: is an upper perspective view of Region Bin FIG. 1.
Figure 9:
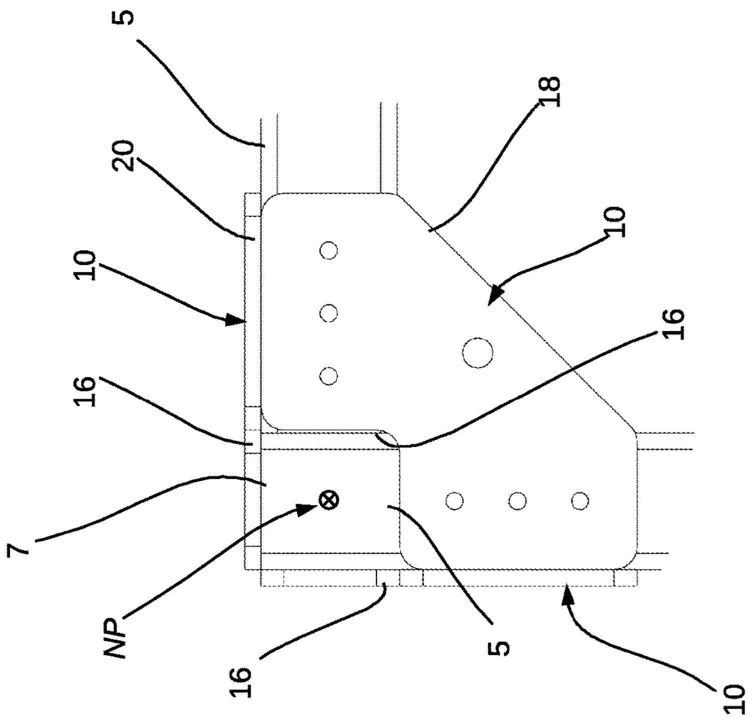
FIG. 9: is a left side view of the portion of the structure shown in FIG. 7.
Figure 8:
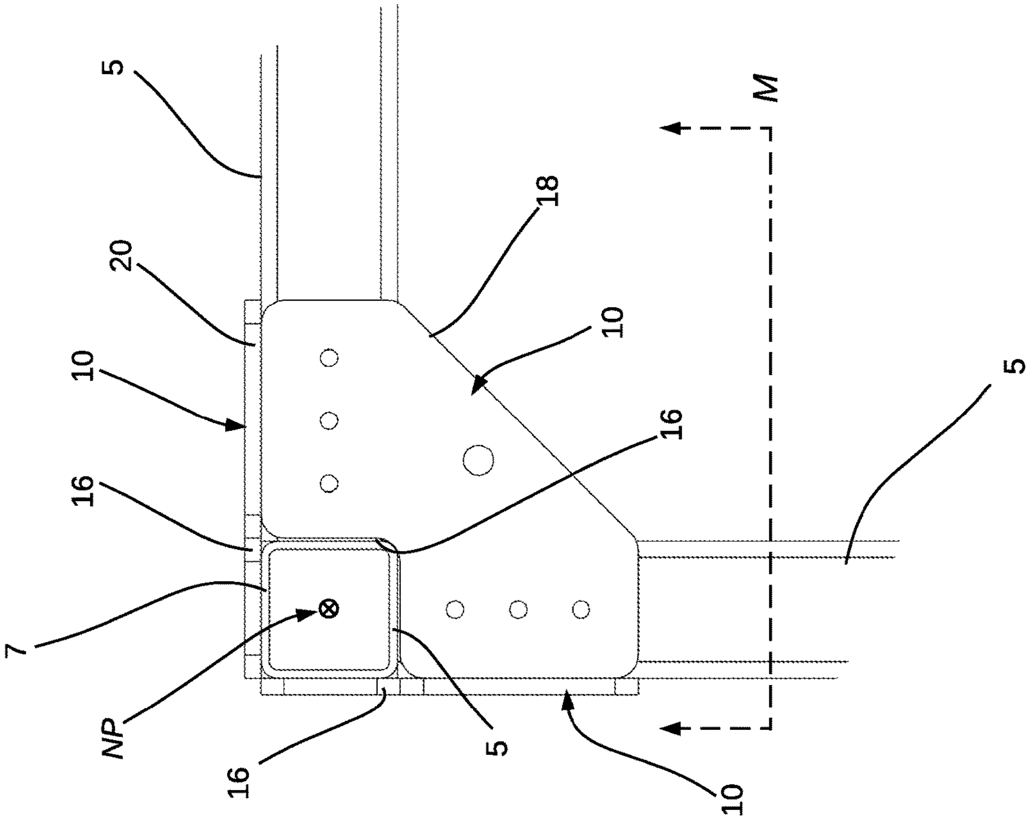
FIG. 8: is a top view of the portion of the structure shown in FIG. 7.
Figure 11:
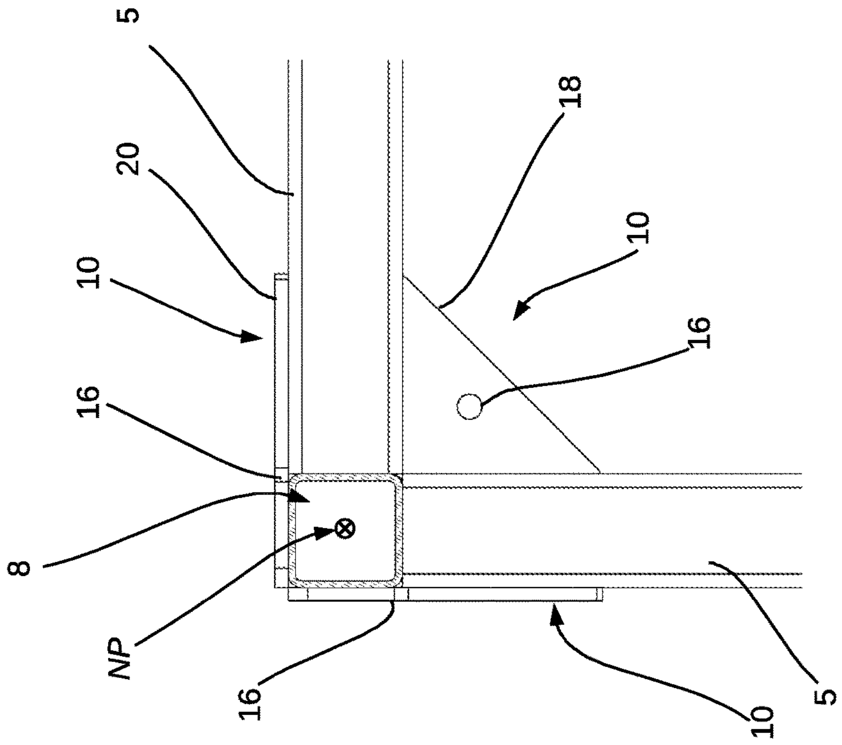
FIG. 11: is a transverse cross section of the portion of the structure as viewed normal to Plane Min FIG. 8.
Figure 10:
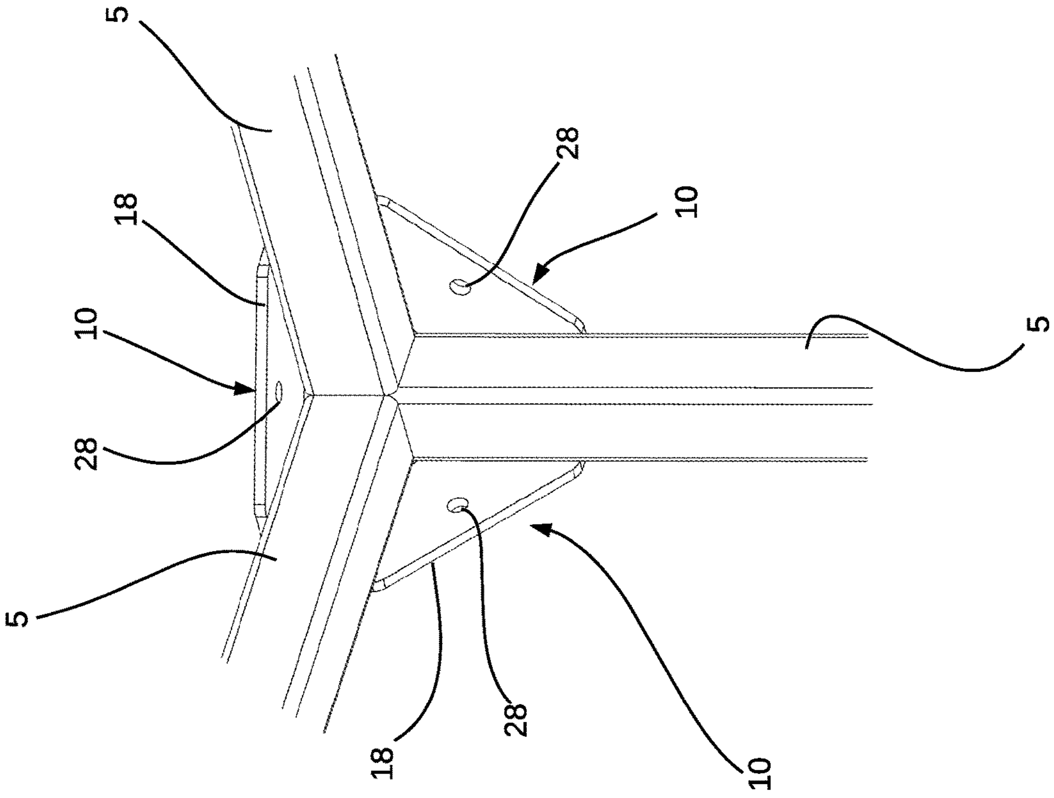
FIG. 10: is a lower perspective view of the portion of the structure shown in FIG. 7.

FIGS. 5 and 6 illustrate an example interconnection of one of the joiners 10 to two spanning members 5*a*, 5*b* using fasteners 26. This interconnection may form a part of a structure together with other components of the modular frame system that are disclosed herein.

As is particularly apparent from FIG. 6, each fastener 26 passes through a respective through hole 24 in the joiner 10 to engage with the respective spanning member 5*a*, 5*b*.

Each interconnection of two or more spanning members 5 with the structure 2 defines a notional node point. In this example, each notional node point is defined by the longitudinal axes of the spanning members 5. In FIGS. 5 and 6, the notional node point NP is indicated by an encircled cross mark ("⊗").

The spacing of the two connection portions 12 of the web portion 14 also spaces the two spanning members 5*a*, 5*b*, rotationally and translationally with respect to one another. To this end, in the particular example illustrated in FIGS. 5 and 6, the spanning members 5*a*, 5*b* are fixed at 90° to one another.

FIG. 6 shows the joiner 10 in a side elevation view. The joiner 10 has a minimum thickness that is greater than the predetermined nominal wall thickness of the spanning members 5*a*, 5*b*. This provides the benefit that in the interconnection of the two spanning members 5*a*, 5*b* by the single joiner 10, as illustrated in FIGS. 5 and 6, the joiner 10 has a strength and stiffness that is similar to that of the individual spanning member material itself.

In an example in which the spanning members 5*a*, 5*b* and the joiner 10 are all made of the same material, it is most likely that failure of the interconnection will occur in the fasteners 26. However, as will be appreciated, the size, form, and number of fasteners 26 (and also the through holes 24) can be tailored to facilitate management of service loads in the structure.

As shown in FIG. 6, the joiner 10 has a thickness t2. In this example, the ratio of the joiner thickness t2 to the predetermined nominal wall thickness t1 is approximately 1.8:1. This particular ratio may be appropriate for spanning members and joiners that are formed of mild steel. It will be appreciated that alternative thickness ratios may be appropriate for embodiments in which a different material is used. Similarly, for embodiments in which the spanning members are formed of a different material to that of the joiner.

When dynamic loads are applied to the frame structure 2, the distribution of forces on the spanning members 5 can act to generate forces acting through the notional node points NP, and torque acting about the notional node points NP. The interconnection of the spanning members 5 by the joiners 10 resists those generated forces and torques.

In the example illustrated in FIGS. 5 and 6, spanning member 5*a* is positioned such that its end face 7 is approximately flush with the external outer surface 9 of spanning member 5*b*, and also approximately flush with one of the two minor lateral edges 20. In other words, the end region 6*a* of spanning member 5*a* extends past both the first major edge 16 and the notional node point NP of the joiner 10. The end face 7 of spanning member 5*b* abuts the external outer surface 9 of spanning member 5*a*. Further, the end face 7 of spanning member 5*b* is approximately flush with the first major edge 16 of the joiner 10.

The web portion 14 includes a mounting hole 28 that is suitable for mounting a cross-brace, as is described in further detail in connection with FIGS. 26 and 27.

FIGS. 5 and 6 indicate alternative configurations of spanning members with respect to the joiner 10. To this end, FIG. 5 includes dashed lines 5' that indicate an alternative position of spanning member 5*a*, in which the end face 7 of spanning member 5*b* would abut the outer surface of spanning member 5*a* at a location intermediate the end regions of that spanning member 5*a*. In this alternative position for spanning member 5*b*, the spanning member 5*a* projects outwardly in opposite direction from the notional node point NP.

Figure 18:
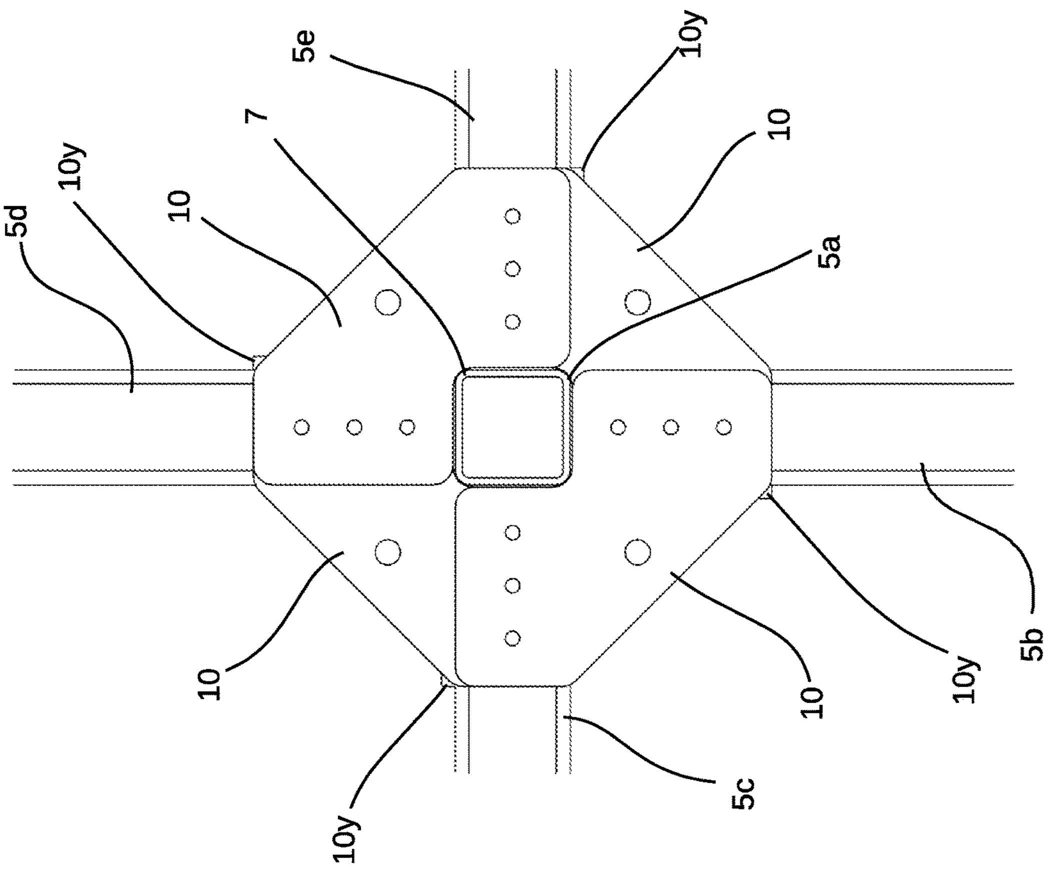
FIG. 18: is a top view of the portion of the structure shown in FIG. 17.
Figure 19:
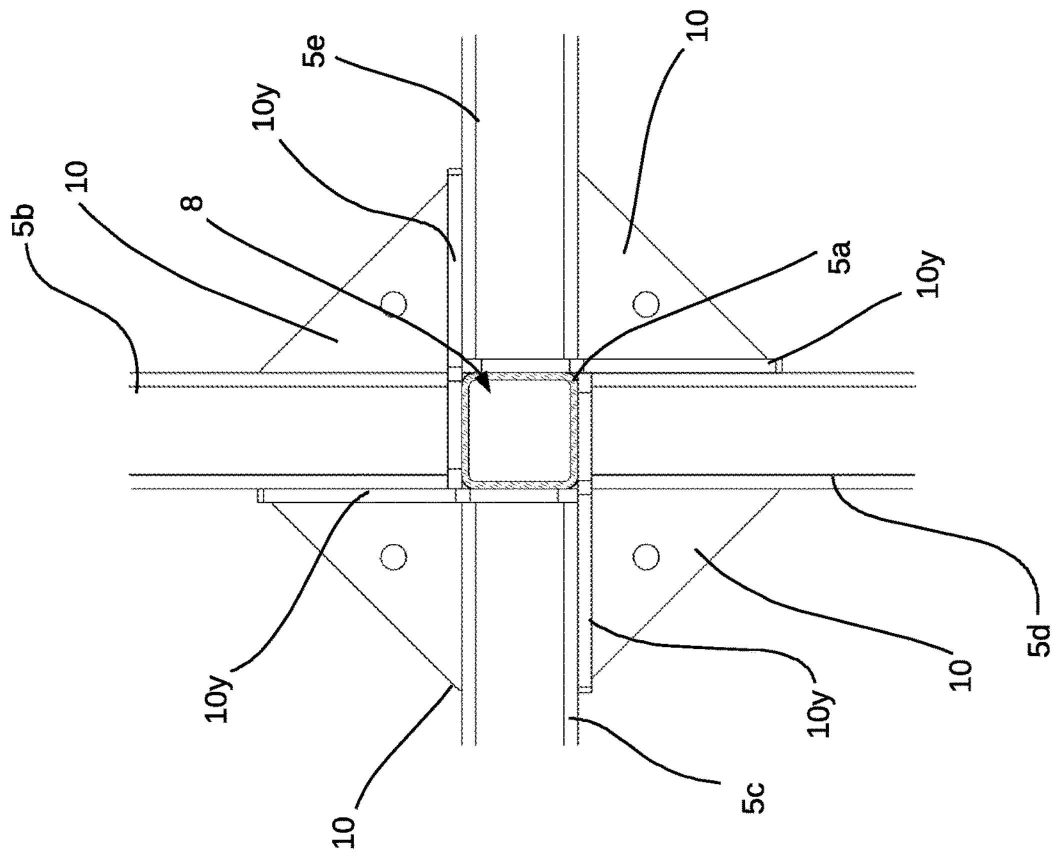
FIG. 19: is a transverse cross section of the structure of FIG. 1, as viewed normal to Plane Pin FIG. 17.

FIG. 6 includes dash-dot lines 5" that indicate a third spanning member that extends through the notional node point NP, but is not secured to the joiner 10. In order to accommodate a third spanning member in the position indicated by dash-dot lines 5", each of spanning members 5*a*, 5*b* need to be positioned such that their respective end faces 7 are approximately flush with the first major edge 16. With the spanning members 5*a*, 5*b* in this position relative to the joiner 10, part of the external outer surface of the third spanning member is positioned within the locating portion of the first major surface. This arrangement of three spanning members with respect to a joiner 10 is also illustrated in FIGS. 18 and 19.

FIGS. 5 and 6 illustrate an interconnection between two spanning members 5, in which a single joiner 10 forms the interconnection. The strength and stiffness of the interconnection between two spanning members (with, or without interconnection to other spanning members) can be increased with the addition of a second joiner that is co-planar with the joiner 10. This arrangement is illustrated in one form in FIGS. 14 to 16.

FIGS. 7 to 11 are enlarged views of Region B of the structure 2 in FIG. 1, in which three spanning members 5 are interconnected via three joiners 10. Accordingly, in this arrangement two joiners 10 are secured to each spanning member 5. In these Figures, the fasteners are omitted for clarity of the relative positions of the spanning members 5 and joiners 10 (and similarly with regard to FIGS. 12 to 20).

The three spanning members 5 are arranged to project outwardly from a notional node point NP (shown in FIGS. 8, 9 and 11) that is located at the intersection of the three longitudinal axes that are defined by the three spanning members 5. The form of the joiners 10, and in particular the co-planar characteristic of the two connection portions 12 of each joiner 10, ensures that the length directions of the three spanning members are mutually orthogonal to one another.

The arrangement of the three joiners 10 at the interconnection between the three spanning members 5 results in the interconnection having substantially equal strength properties in each orthogonal direction. However, as will be evident from FIGS. 10 and 11, it would be possible for the structure to be assembled with an additional joiner 10, such that two of the three spanning members 5 would be secured to three joiners 10 (and the third spanning member secured to two joiners 10). In this scenario, the strength properties would not be equal in each orthogonal direction.

Figure 12:
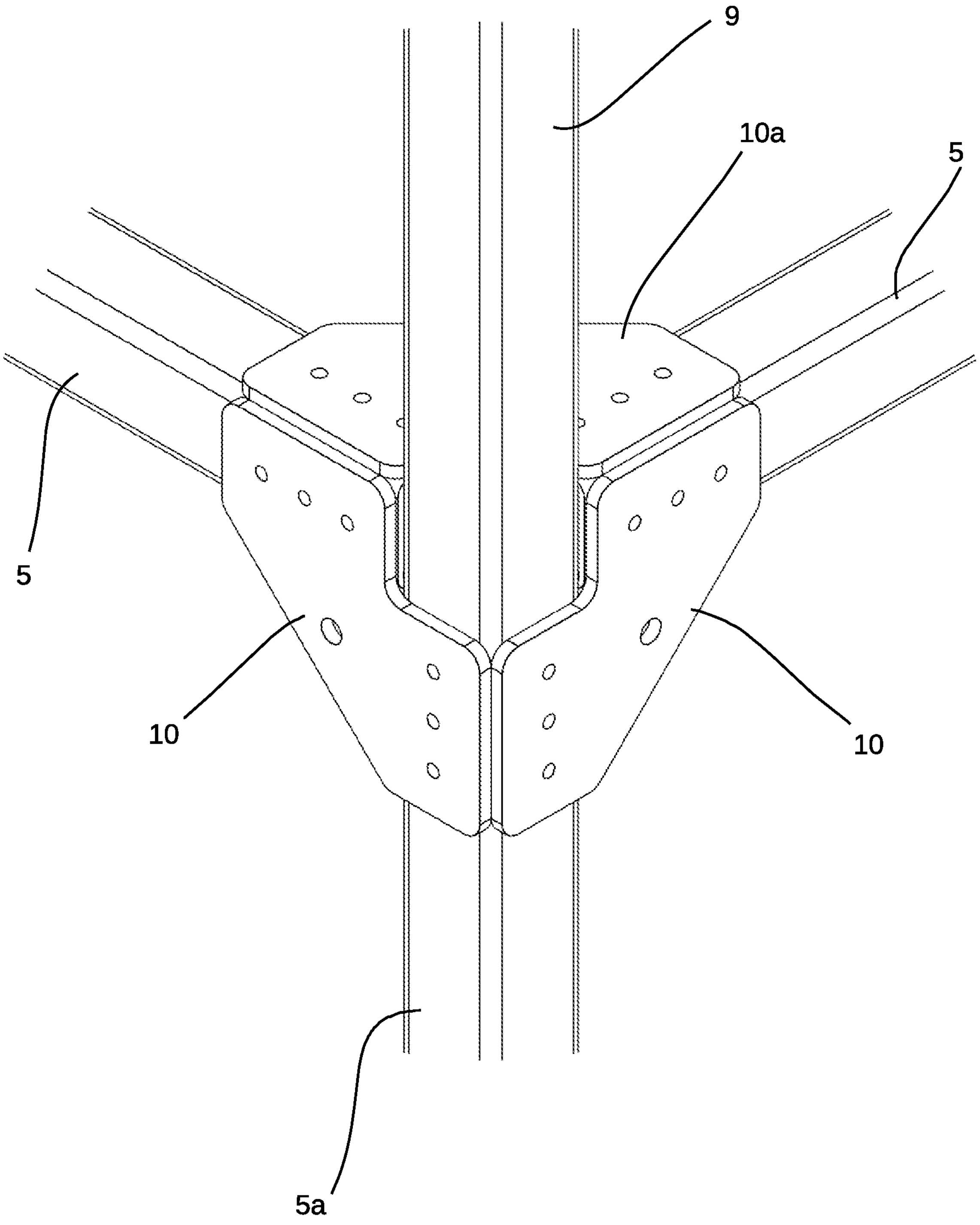
FIG. 12: is a first upper perspective view of Region C in FIG. 1.
Figure 13:
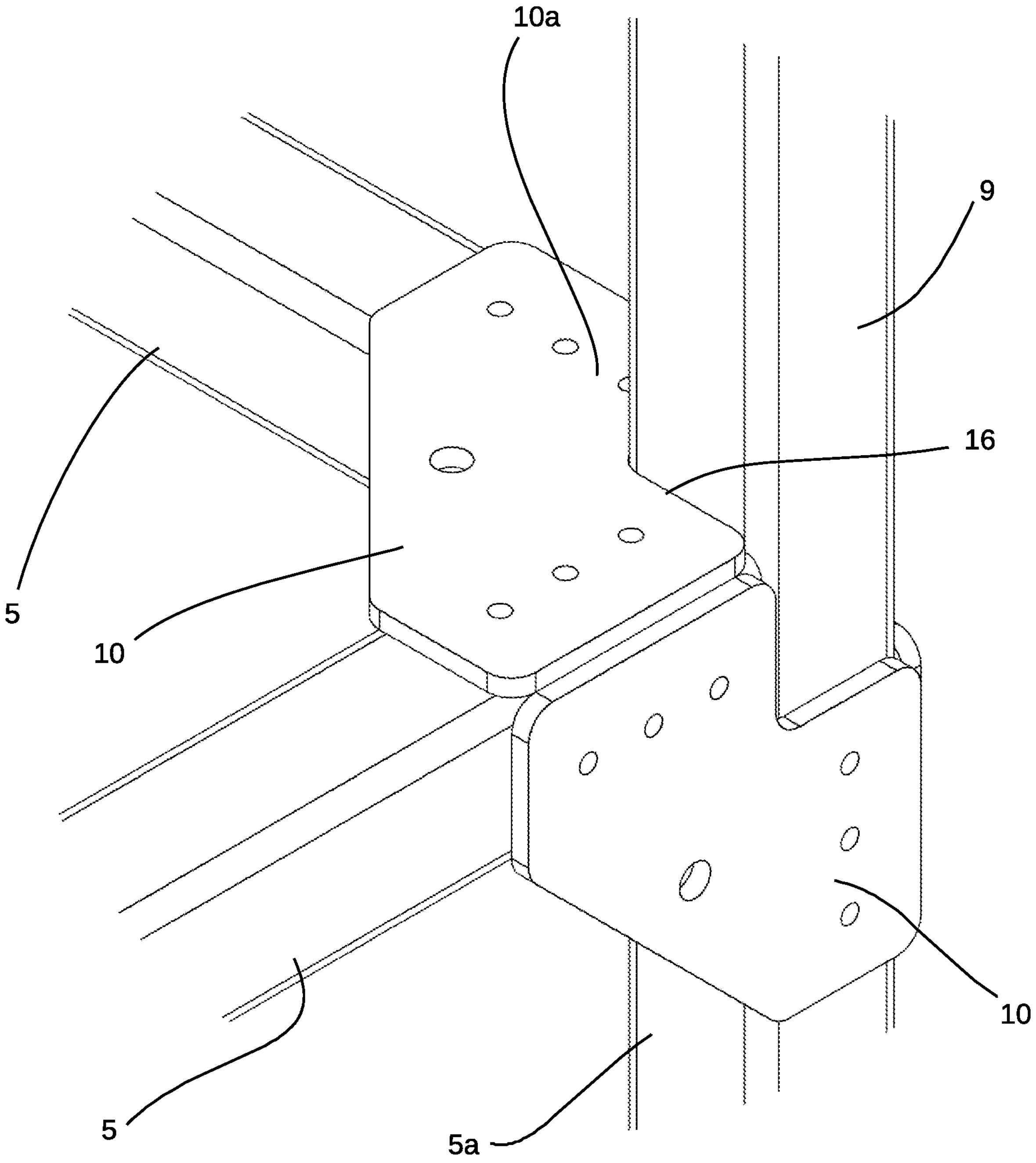
FIG. 13: is a second upper perspective view of the portion of the structure shown in FIG. 12.

FIGS. 12 and 13 are enlarged views of Region C of the structure 2 in FIG. 1. The arrangement in this region of the structure 2 differs from that in Region Bin that one of the three spanning members (spanning member 5*a* in FIGS. 12 and 13) has joiners 10 secured at a position that is intermediate the end regions (not shown in FIGS. 12 and 13). In this arrangement, the external outer surface 9 of spanning member 5*a* is disposed within the locating portion of joiner 10*a*, and adjacent the first major edge 16.

Figure 14:
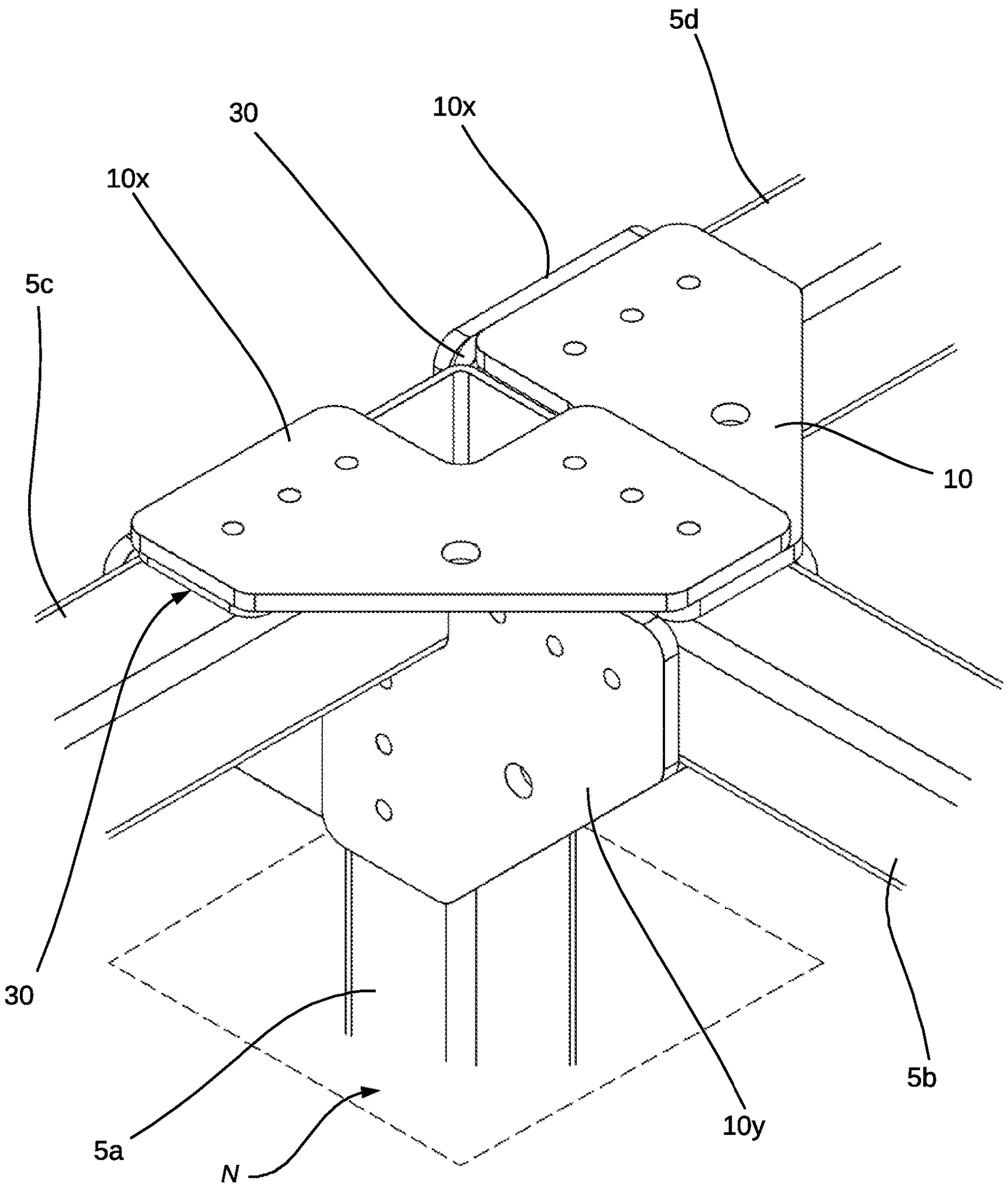
FIG. 14: is an upper perspective view of Region D in FIG. 1.
Figure 16:
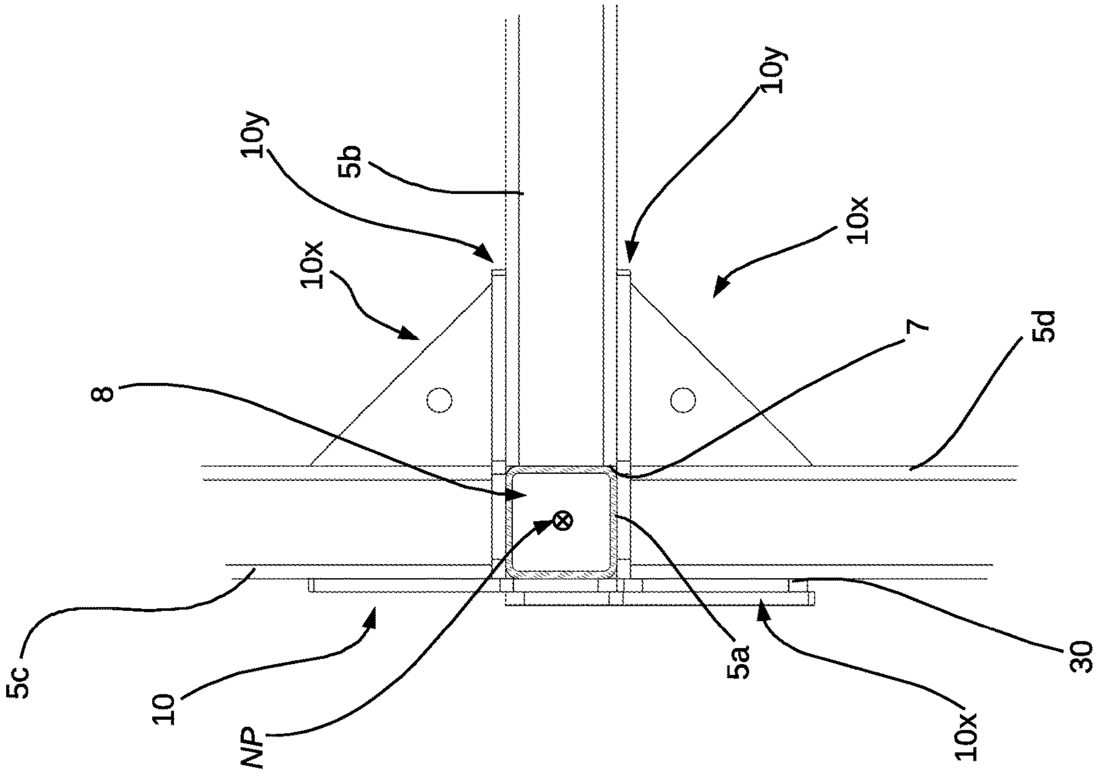
FIG. 16: is a transverse cross section of portion of the structure as viewed normal to Plane N in FIG. 14.
Figure 15:
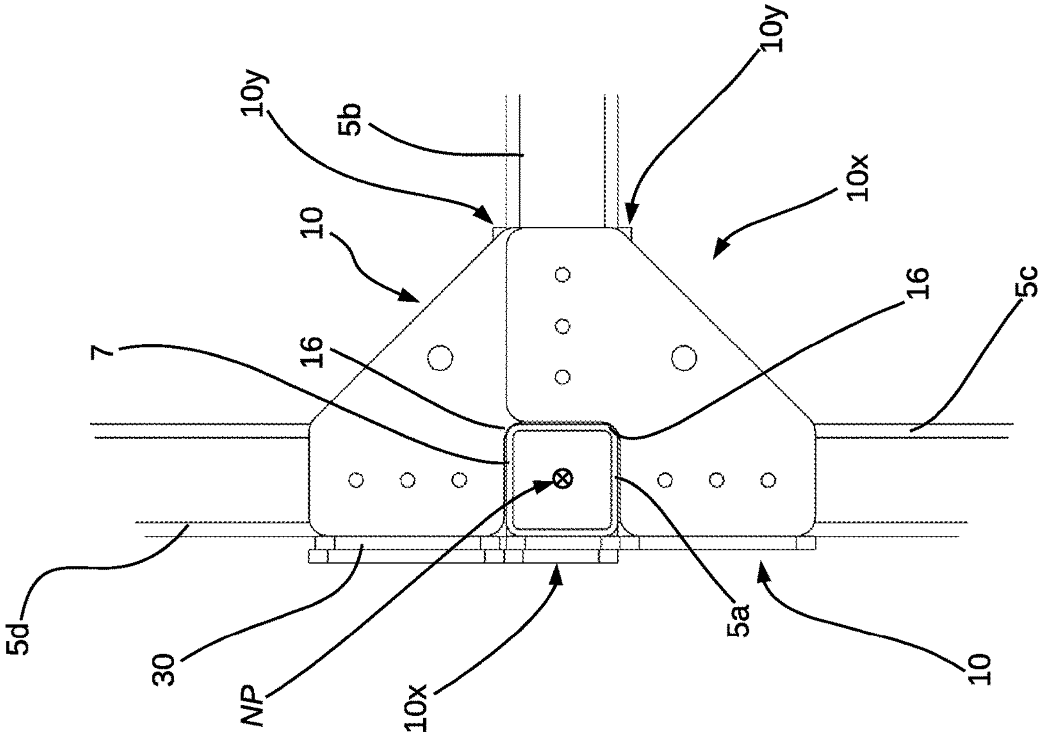
FIG. 15: is a top view of the portion of the structure shown in FIG. 18.

FIGS. 14 to 16 are enlarged views of Region D of the structure 2 in FIG. 1, in which four spanning members 5 are interconnected via six joiners 10. In this arrangement, four joiners 10 are secured to two of the spanning members (spanning members 5*a*, 5*b* in these Figures), and two joiners 10 are secured to the other two (spanning members 5*c*, 5*d* in these Figures).

Figure 34:
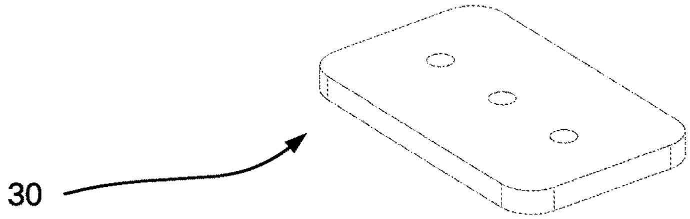
FIG. 34: is a perspective view of a packing spacer of modular frame systems according to embodiments of the present invention.

For each of spanning members 5*a*, 5*b*, the respective four joiners 10 are secured to three of the four planar faces of the external outer surface. To accommodate this arrangement, the connection portions 12 of two of those four joiners 10 are overlapped. As will be appreciated, for one of these joiners in the group of four (joiner 10*x* in these Figures) this configuration creates an offset separation between the connection portion 12 of that the joiner 10*x* and the external outer surface of the other spanning member 5 to which that joiner 10*x* is secured. The modular framing system includes packing spacers 30 (shown in further detail in FIG. 34) that are installed between the joiner 10*x* and the corresponding spanning member 5 and fill that offset separation.

One of the end faces of each spanning member 5*c*, 5*d* is in abutment with the external outer surface of spanning member 5*a*. Accordingly, end regions of those spanning members 5*c*, 5*d* are disposed within the locating portions of two of the joiners (joiners 10*y* in FIGS. 14 and 16).

As will be appreciated, in FIGS. 14 to 16 spanning members 5*a*, 5*b* are interconnected between two joiners 10*y* in a "sandwich" type arrangement.

Referring particularly to FIG. 14, it will be appreciated that in a similar but alternative arrangement to that illustrated in FIG. 14, spanning member 5*a* could be positioned such that the joiners 10 are secured at a position that is intermediate the respective end regions, and the external outer surface of spanning member 5*a* is disposed within the locating portion of two of the joiners 10.

Figure 17:
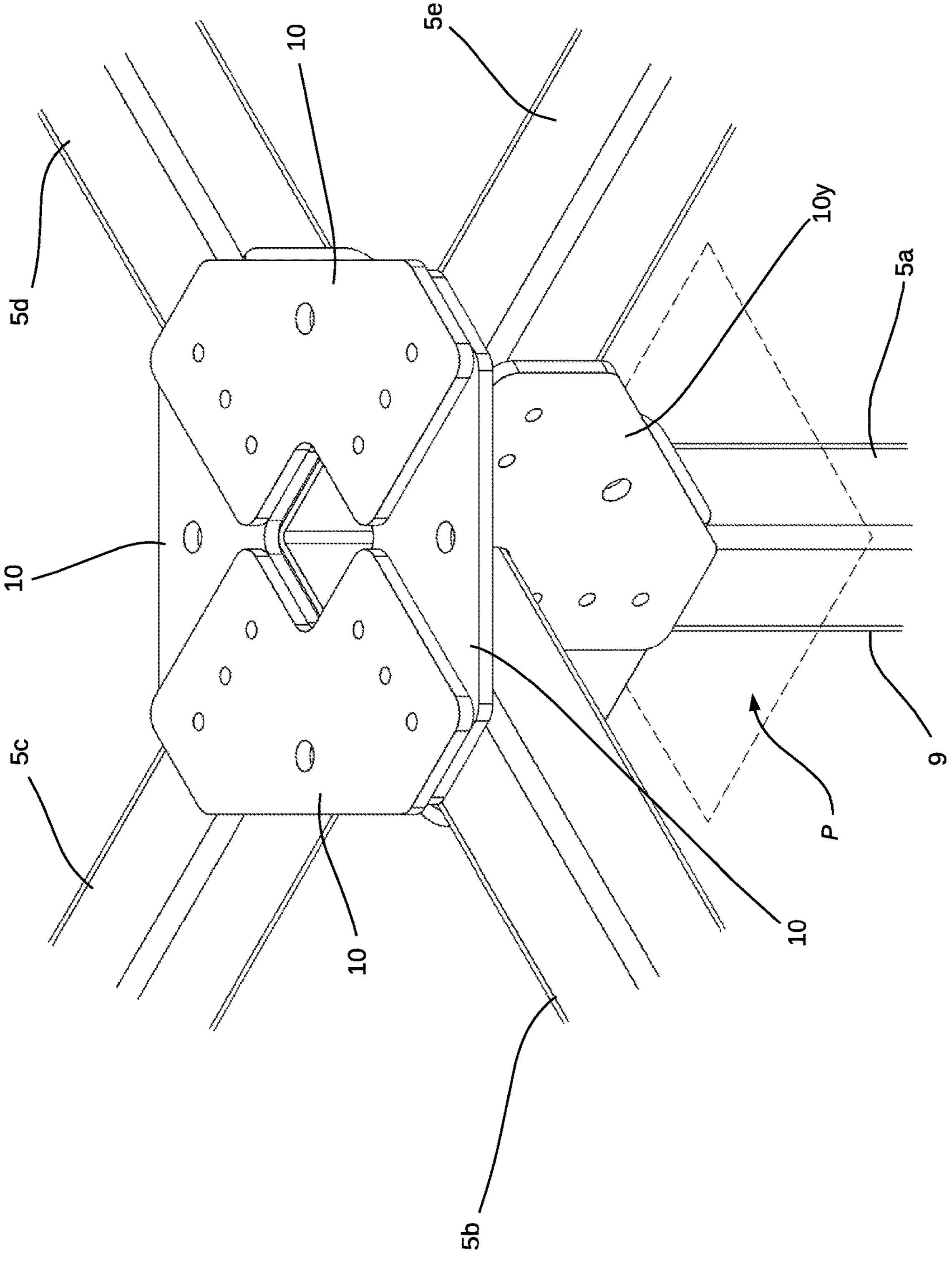
FIG. 17: is an upper perspective view of Region E in FIG. 1.

FIGS. 17 to 19 are enlarged views of Region E of the structure 2 in FIG. 1, in which five spanning members 5 are interconnected via eight joiners 10. Accordingly, in this arrangement three joiners 10 are secured to each spanning member 5. At this interconnection, four of the spanning members (spanning members 5*b* to 5*e* in these Figures) each have one of their respective end faces in abutment with the external outer surface 9 of spanning member 5*a*. Accordingly, end regions of those spanning members 5*b* to 5*e* are disposed within the locating portions of four of the joiners (joiners 10*y* in FIG. 19).

Figure 21:
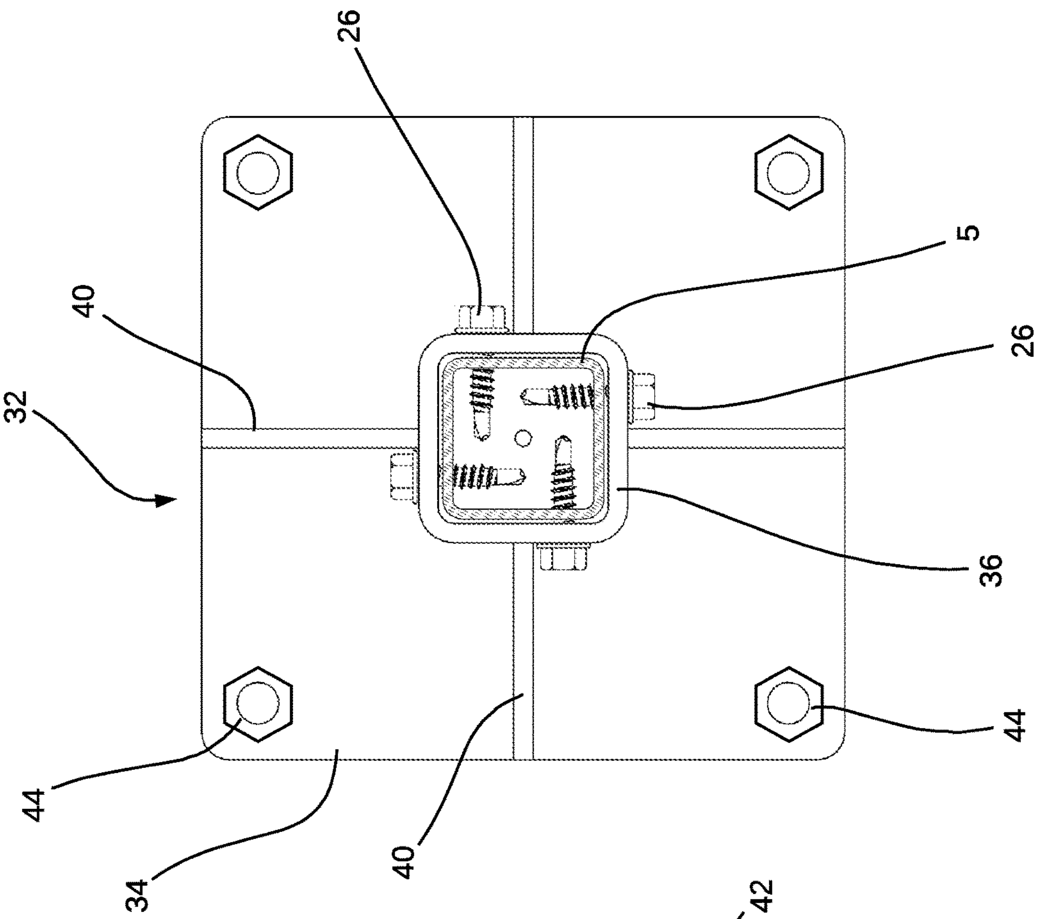
FIG. 21: is a transverse cross section of the structure of FIG. 1, as viewed normal to Plane L in FIG. 20.
Figure 20:
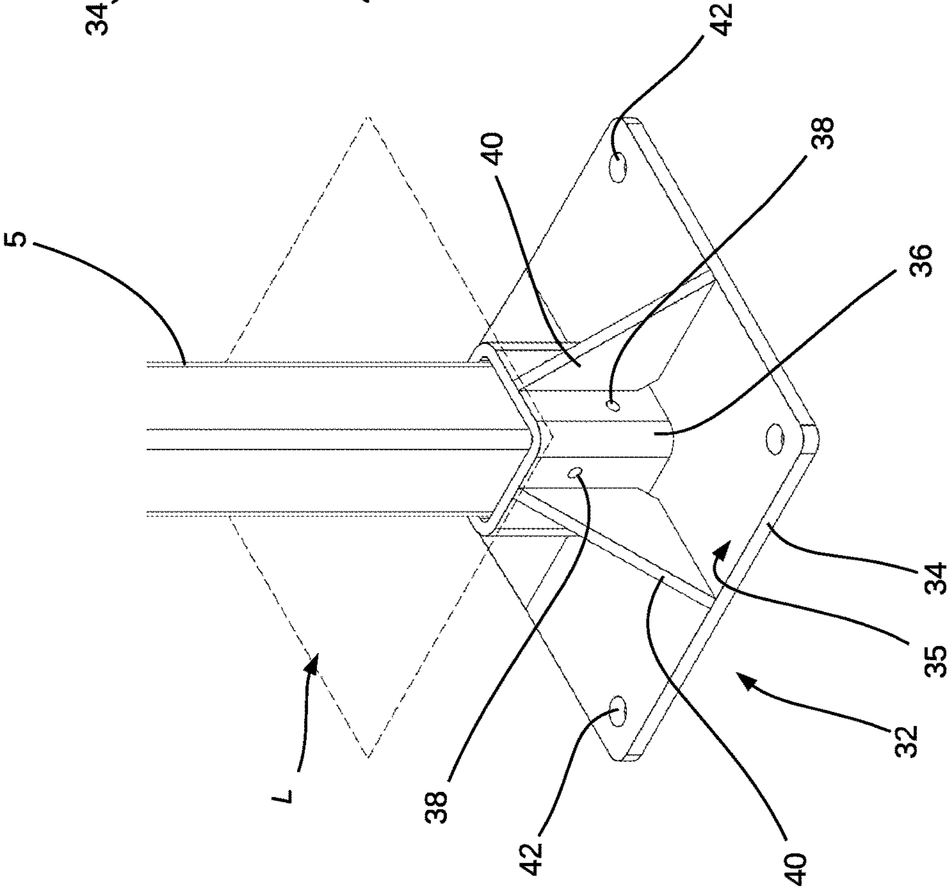
FIG. 20: is an enlarged view of Region A in FIG. 1, showing a foot of the system.

FIGS. 20 and 21 are enlarged views of Region A of the structure 2 in FIG. 1. The example structure 2 of FIG. 1 is configured to be mounted to a supporting structure, such as foundation or the like. The feet 32 of the modular frame system are used to connect spanning members 5 of the structure 2 to that supporting structure. As shown in these Figures, each foot 32 has a base plate 34, and a mating portion that is configured to mate with an end portion 6 of one of the spanning members 5.

In this embodiment, the mating portion is in the form of a sleeve formation 36 that is shaped to receive an end portion of one of the spanning members. To this end, the internal dimensions of the sleeve formation 36 provide at least a clearance fit for the spanning member 5.

The base plate 34 has a primary face (not visible in the Figures) that faces towards the supporting structure to which the respective foot 32 is connected. The sleeve formation 36 is attached to the base plate 34 on the opposing face to the primary face. In the orientation of the foot 32 that is illustrated in FIGS. 20 and 21, the opposing face is the upper face 35. Thus, the spanning member 5 that is mated to the foot 32 projects away from the base plate 34 in a direction that is substantially opposite to the primary face.

As shown in FIG. 20, the sleeve formation 36 includes through holes 38 (shown in FIG. 20) through which to pass one of the fasteners 26 of the system to secure the foot 32 and mated spanning member 5 to one another (as shown in FIG. 21). In this particular embodiment, the sleeve formation 36 has eight through holes 38, such that up to eight fasteners 26 can be used to secure the spanning member 5 to the foot 32.

The foot 32 also has gussets 40 that are each attached to the external surface of the sleeve formation 36 and the upper face 35 of the base plate 34. The gussets 40 provide increased attachment and rigidity to the sleeve formation 36.

The base plate 34 includes mounting holes 42 (shown in FIG. 20) for use in connecting the foot 32 to the support structure. To this end, the shank of a fastener 44 (shown in FIG. 21) can pass through each the mounting hole. The type of fastener used will depend on the support structure.

The modular frame system provides benefits of enabling frame structures of different shapes and configurations to be constructed using standardised components (such as joiners 10 and feet 32), together with spanning members 5 formed of readily available, non-proprietary materials and fasteners 26. By way of example, in module frame systems that use structural steel square tube for the spanning members, the lengths of spanning members can be selected to suit the desired application, and obtained at low cost. Further, the joiners 10 and fasteners 26 interconnect the spanning members with a high level of structural strength and rigidity. Within pre-determined limits, the assembled frame structures can be rated to withstand seismic events up to a certain magnitude, and/or to withstand exposure to elevated temperatures in accordance with fire safety regulations.

Assembly of the frame structure 2 from the components of the modular frame system can involve:

Step 1—installing a foot 32 in the desired location by mounting that foot 32 to the supporting structure;

Step 2—installing a spanning member 5 by securing that spanning member 5 to the foot 32 installed at Step 1 using fasteners 26;

Step 3—securing one or more joiners 10 to the spanning member 5 installed at Step 2 using fasteners 26; and Step 4—one or both of:

4.1: repeating Steps 1 to 3, to install additional feet 32 and spanning members 5, and 4.2: iteratively:

4.2.1: securing previously installed joiners 10 to an additional spanning member 5 using fasteners 26, and 4.2.2: securing one or more additional joiners 10 to the spanning member 5 installed at Step 4.2.2 using fasteners 26.

In embodiments in which the fasteners 26 have a tip with a self-drilling formation, Steps 2, 3 and 4.2 can involve installing each fastener 26 in one of the through holes 24 in the connection portions 12 of the respective joiner 10, and driving that fastener 26 to form a hole in the wall of the spanning member 5 and then to engage the spanning member 5.

In some alternative embodiments in which the fasteners 26 include a nut and bolt pair, each of Steps 2, 3 and 4.2 can additionally involve forming a hole in the respective spanning member 5.

In some instances, it may be desirable or necessary for the assembly method to additionally involve establishing a permanent or temporary non-structural connection between the joiner and the spanning member(s) prior to installing the fasteners. Examples of such permanent or temporary non-structural connections include clamps, jigs, rapid fixing adhesive materials (particularly pressure sensitive adhesive—for example, in the form of double-sided tape).

Figure 22:
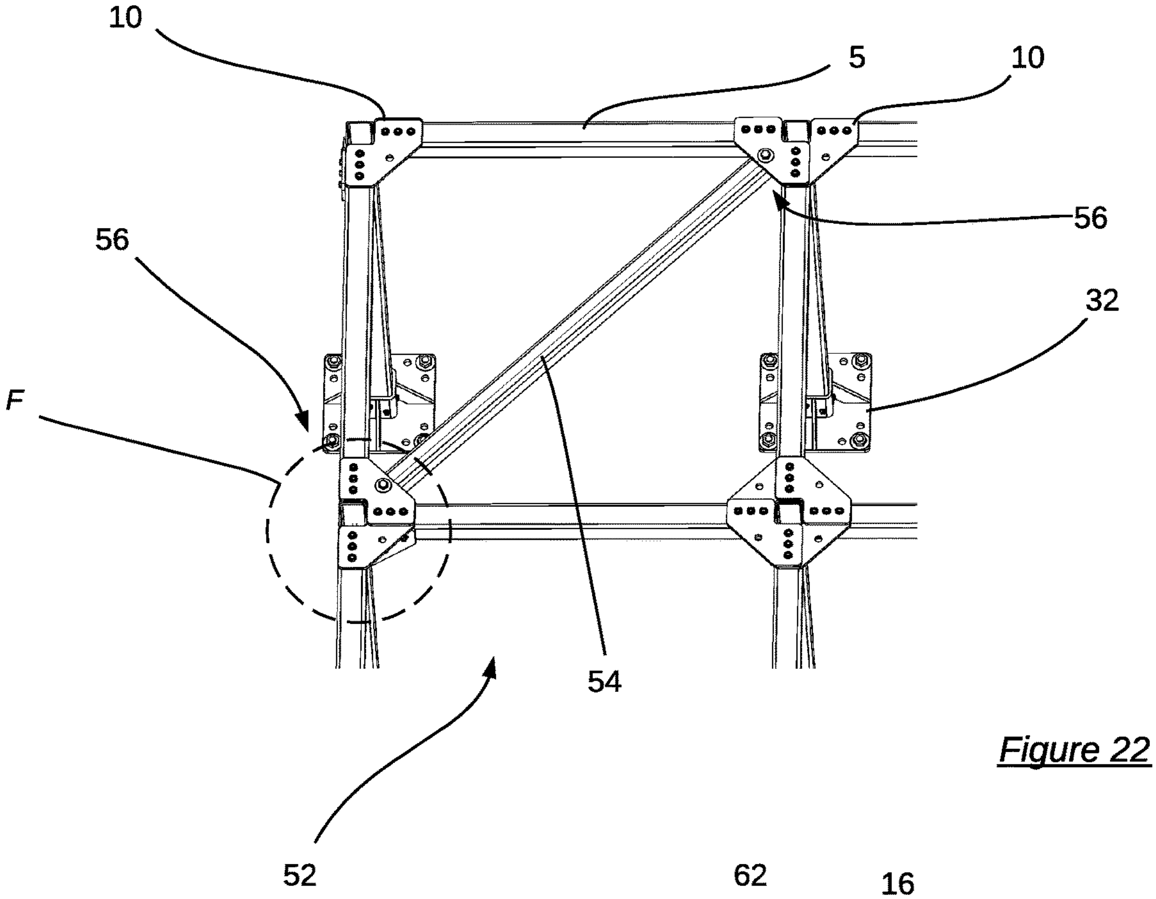
FIG. 22: is an upper perspective view of a portion of the structure of FIG. 1, showing a cross-brace of the system.
Figure 23:
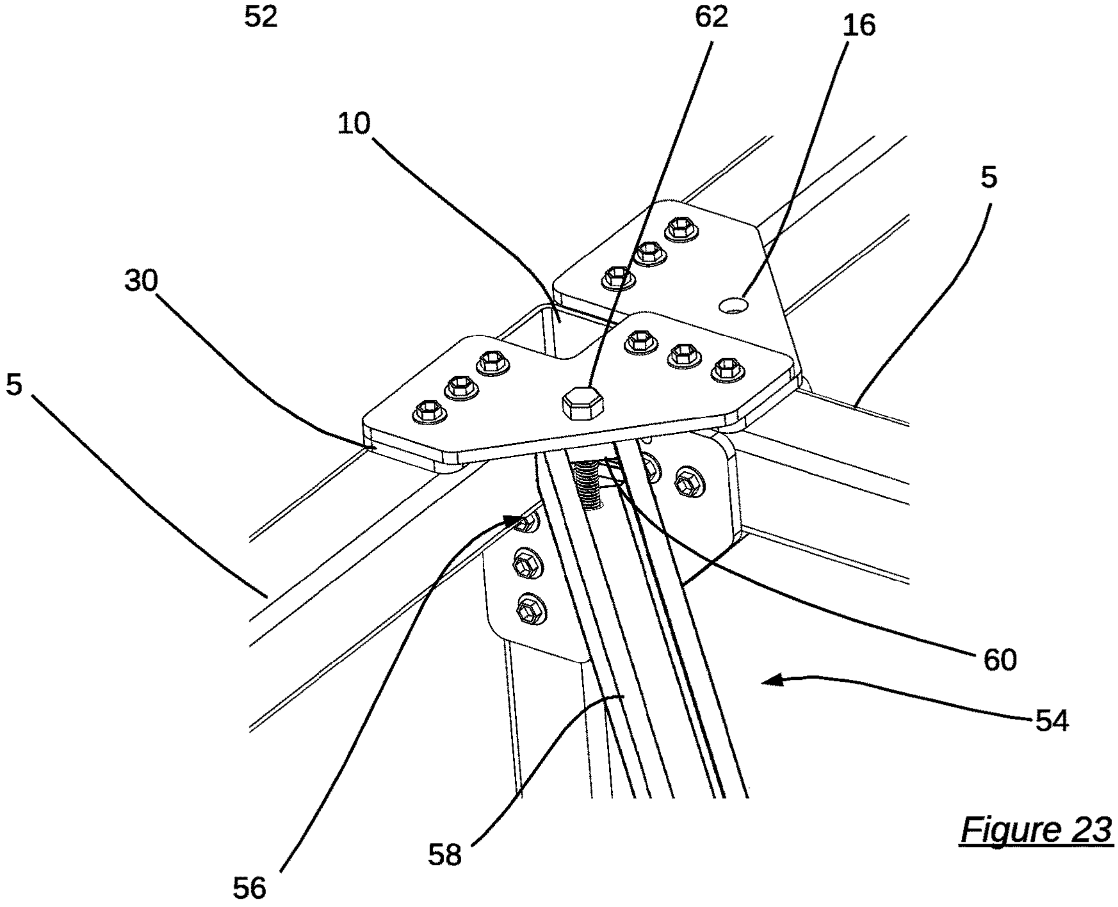
FIG. 23: is an upper perspective view of Region Fin FIG. 22.

FIGS. 22 and 23 show part of a frame structure 52 that is substantially similar to structure 2 shown in FIG. 1. The assembled structure 52 is constructed using components of the same modular frame system; specifically as illustrated, spanning members 5, joiners 10 and fasteners 26. The frame structure 52 additionally incorporates a cross-brace 54. End regions 56 of the cross-brace 54 are mounted to a pair of the joiners via the mounting holes 28 in the web portions 14, as shown in FIG. 23 in further detail.

The joiners 10 are configured to enable the cross-brace 54 to project away from the respective joiners 10 at an oblique angle to spanning members 5 that are secured to those same joiners 10, as illustrated in FIG. 22.

In the example of FIGS. 22 and 23, the cross-brace 54 includes a length of channel strut 58 that is secured to the web portion 14 by a strut nut 60 and a fastener 62 that extends through the mounting hole 28 in the web portion 14. This securing arrangement enables the position of the end region 56 of the channel strut 58 with respect to the joiner to be adjusted. In this way, the effective length of the cross-brace 54 is adjustable.

Figure 25:
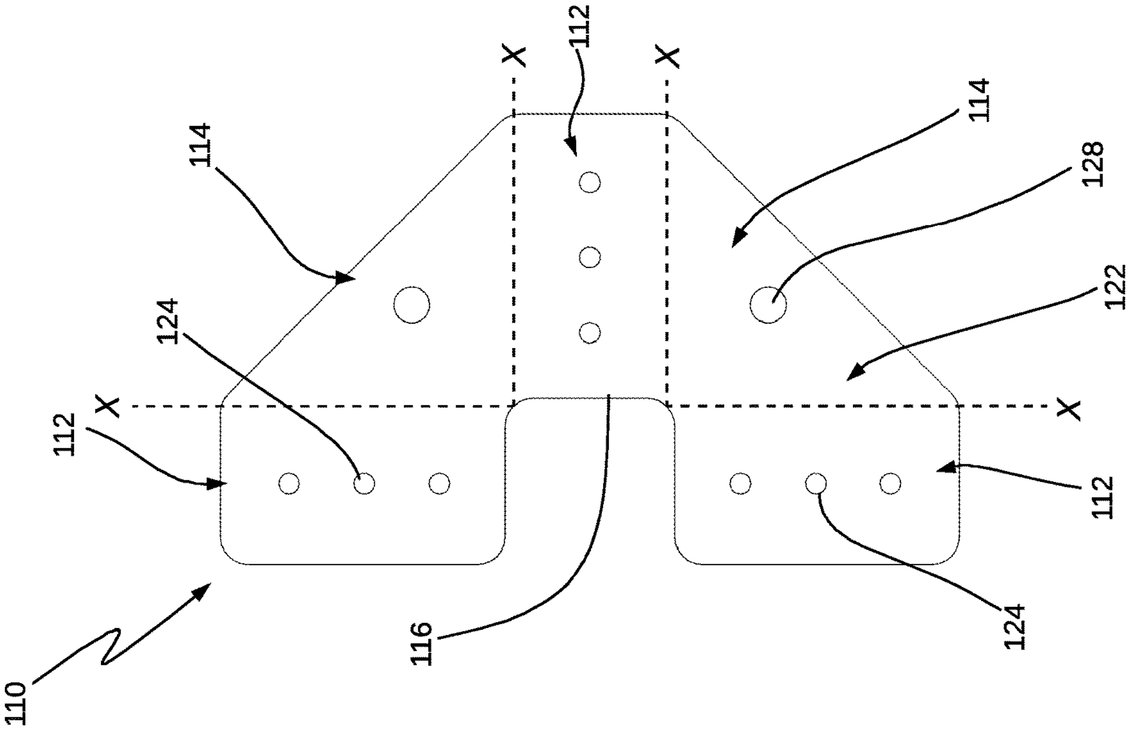
FIG. 25: is a plan view of the joiner of FIG. 24.
Figure 24:
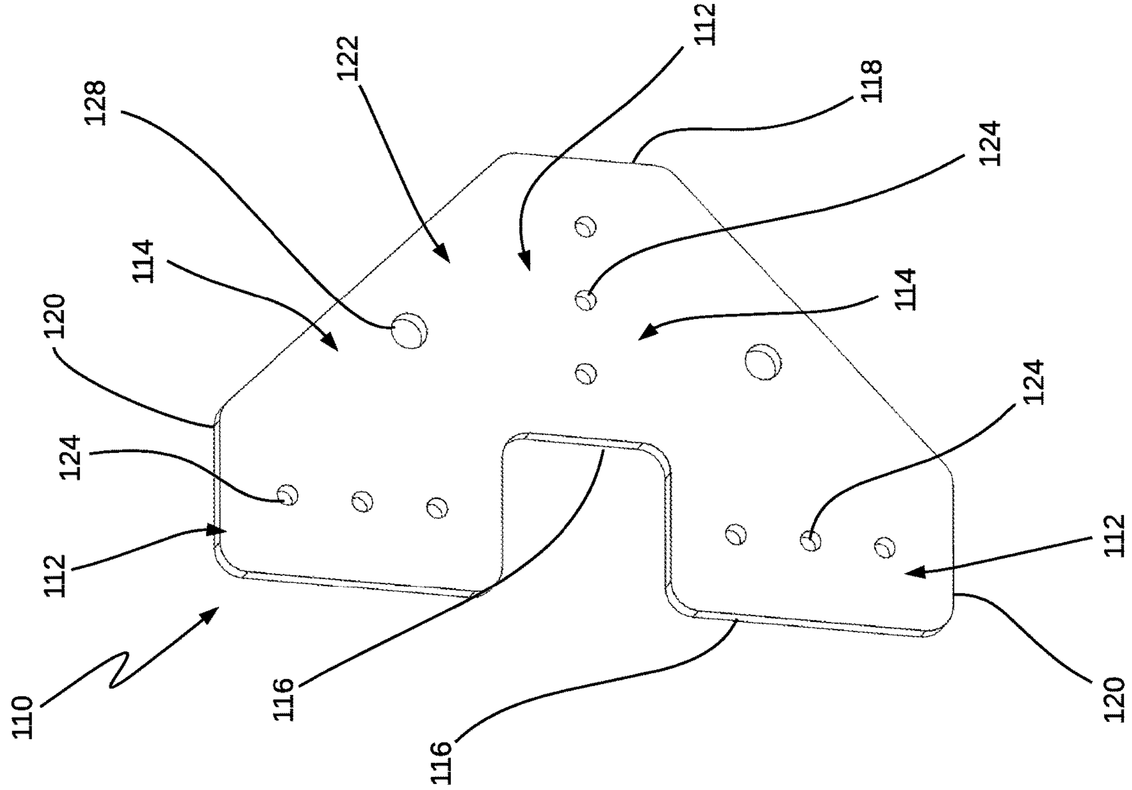
FIG. 24: is a perspective view of a joiner of a modular frame system of another embodiment.

FIGS. 24 and 25 show a joiner 110 of another embodiment. The joiner 110 is suitable for inclusion and use within the modular framing system from which the structure 2 of FIG. 1 is assembled. Parts of the joiner 110 that are the same or similar to parts of the joiner 10 have the same reference numbers with the prefix "1" and for succinctness, will not be described again.

The joiner 110 has three connection portions 112, and two web portions 114. Each of the two web portions 114 interposes an adjacent pair of the connection portions 112. In FIG. 25, four dashed lines X indicate the boundaries of the three connection portions 112 and two web portions 114.

The joiner 110 can be used in interconnections such as those shown in FIGS. 14 to 19 as a substitute for two of the overlapped joiners 10. Where the joiner 110 is used in a frame structure, two spanning members 5 that are secured to two of the three connection portions 112 will project outwardly away from the joiner 110 in directions that substantially parallel and co-axial. A third one of the spanning members 5 secured to the third connection portion 112 of the joiner 110 will project outwardly away from the joiner 110 in a direction that is substantially perpendicular to the other two spanning members 5. The three spanning members 5 that are secured to the three connection portions 112 will be substantially co-planar with one another.

Part of another spanning member 5 of the assembled frame structure that incorporates joiner 110 can be disposed in the locating portion of the first major edge 116.

Figure 27:
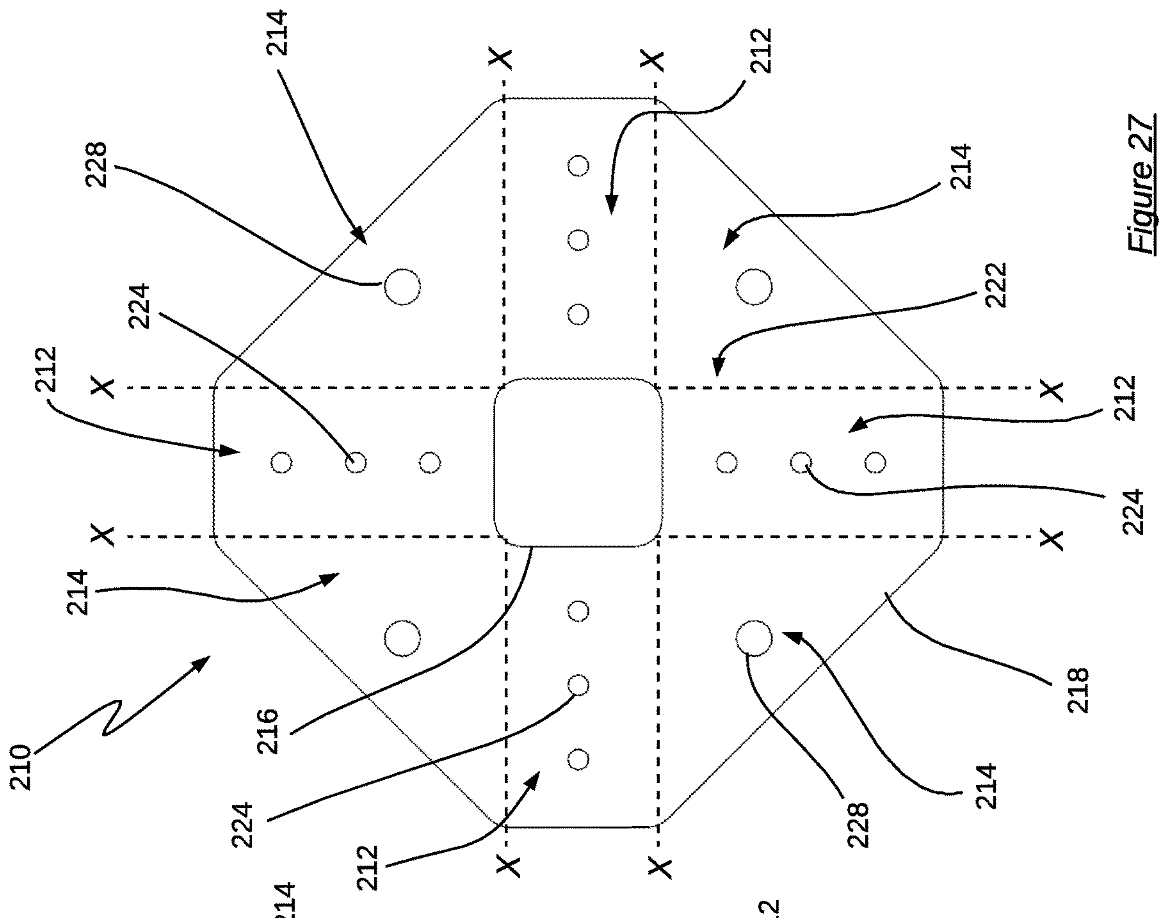
FIG. 27: is a plan view of the third joiner of FIG. 26.
Figure 26:
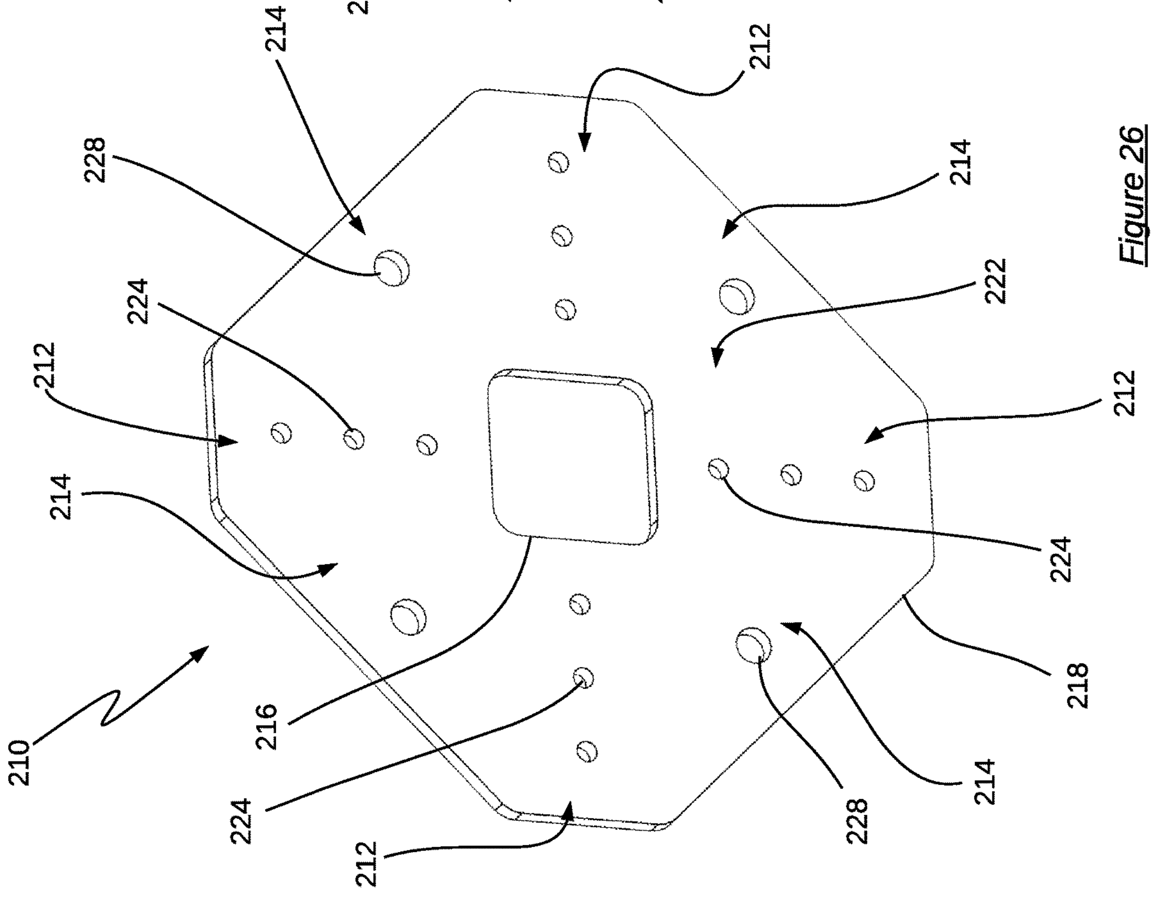
FIG. 26: is a perspective view of a joiner of a modular frame system of another embodiment.

FIGS. 26 and 27 show a joiner 210 of another embodiment. The joiner 210 is suitable for inclusion and use within the modular framing system from which the structure 2 of FIG. 1 is assembled. Parts of the joiner 210 that are the same or similar to parts of the joiner 10 have the same reference numbers with the prefix "2" and for succinctness, will not be described again.

The joiner 210 has four connection portions 212, and four web portions 214. Each of the four web portions 214 interposes an adjacent pair of the connection portions 212.

In FIG. 27, eight dashed lines X indicate the boundaries of the four connection portions 212 and four web portions 214.

The joiner 210 has a generally annular shape. As shown in FIGS. 26 and 27, the first major edge 216 defines the inwardly facing edge of that annular shape.

The joiner 210 can be used in interconnections such as those shown in FIGS. 17 to 19 as a substitute for the four overlapped joiners 10. Where the joiner 210 is used in a frame structure, four spanning members 5 that are secured to each of the four connection portions 212 will project outwardly away from the joiner 210 in directions that substantially perpendicular to two of the other three spanning members 5, and parallel to the remaining spanning member 5. The four spanning members 5 that are secured to the three connection portions 212 will be substantially co-planar with one another.

Part of another spanning member 5 of the assembled frame structure that incorporates joiner 210 can be disposed in the aperture that is formed by the first major edge 216.

Figure 28:
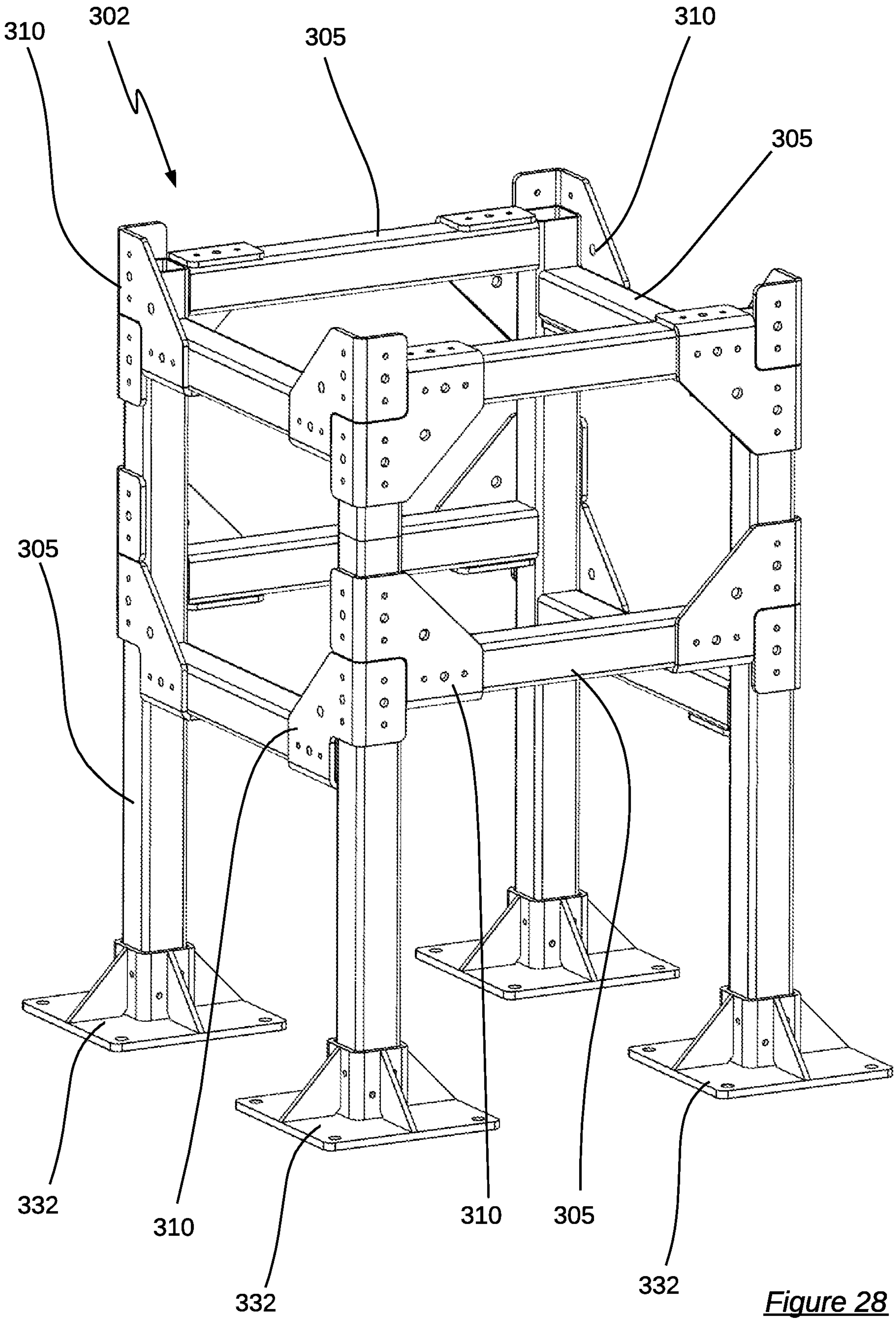
FIG. 28: is a perspective view of an illustrative structure constructed from components of a modular frame system according to a second embodiment of the present invention.

FIG. 28 shows an illustrative structure 302 that is assembled from a modular frame system according to another embodiment. The frame system includes spanning members 305, feet 332, and fasteners that are substantially similar to those of the system described and illustrated in connection with FIG. 1. The frame system also includes joiner 310, one of which is illustrated in FIGS. 29 to 31.

Figure 30:
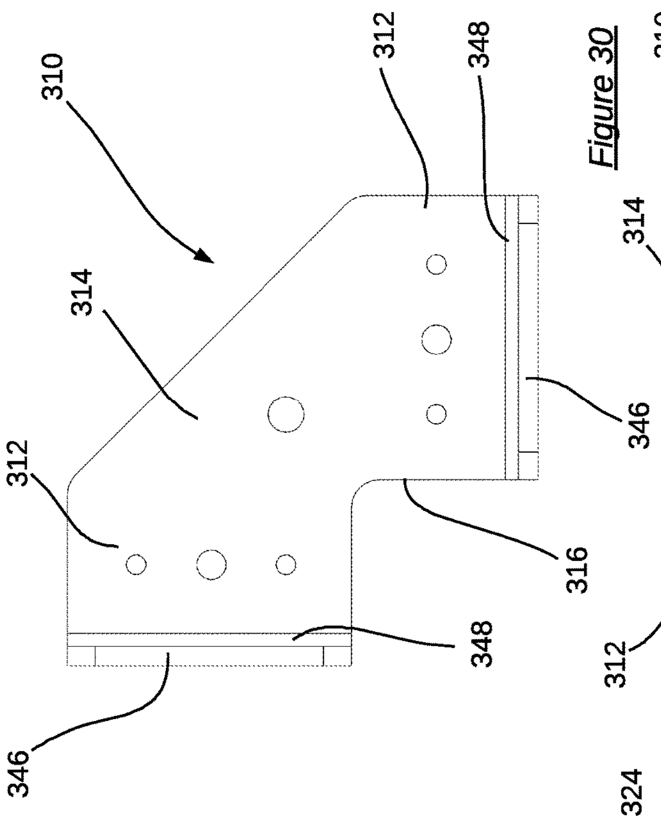
FIG. 30: is a left side view of the joiner of FIG. 28.
Figure 31:
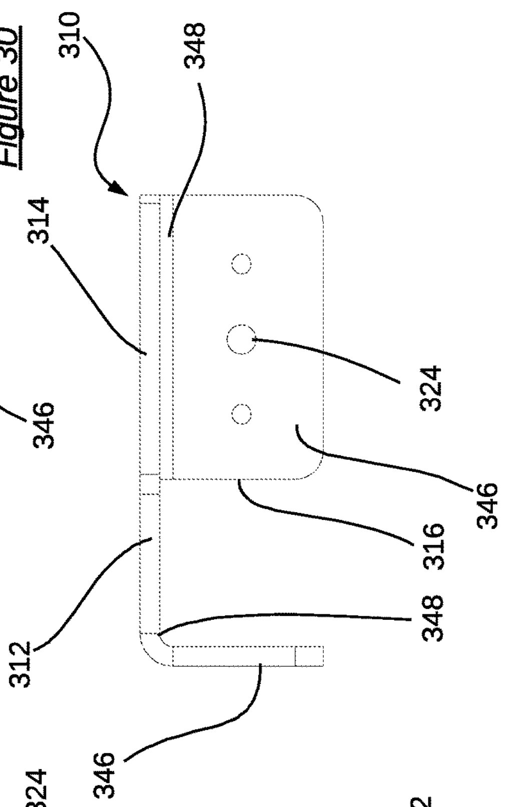
FIG. 31: is a top view of the joiner of FIG. 28.
Figure 29:
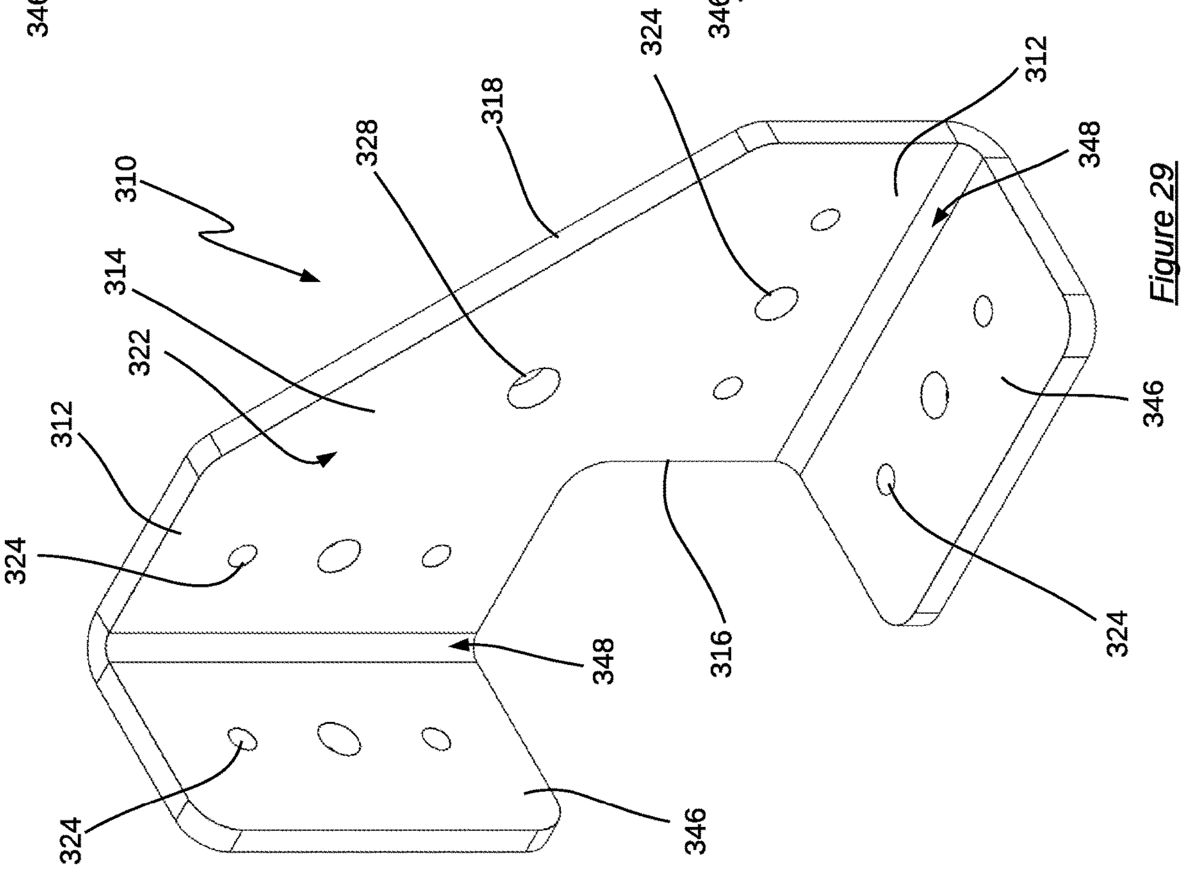
FIG. 29: is a perspective view of a joiner of the system shown in FIG. 28.

The joiner 310 has features that are similar to those of joiner 10, and in FIGS. 29 to 31 those similar features are indicated with reference numerals used above in reference to the joiner 10 with an increment of 300.

The joiner 310 has two outer connection portions 346, and two arcuate interposing web portions 348. Each arcuate interposing web portion 348 is contiguous with one of the connection portions 312 and one of the outer connection portions 346. The arcuate interposing web portions 346 are shaped such that the outer connection portions 346 are orthogonal to the plane of the connection portions 312 and web portion 316. Further, the two outer connection portions 346 are in planes that are orthogonal to one another.

Each outer connection portion 346 has through holes 324 through which to pass one of the fasteners to secure the joiner 310 to one of the spanning members 305.

As will be evident from FIG. 28, the joiner 310 is able to be assembled within the frame structure 302 so as to be secured to two spanning members 305. Either of those two spanning members can extend through the notional node point that is defined by the intersection of the longitudinal axes of those spanning members.

Figure 32:
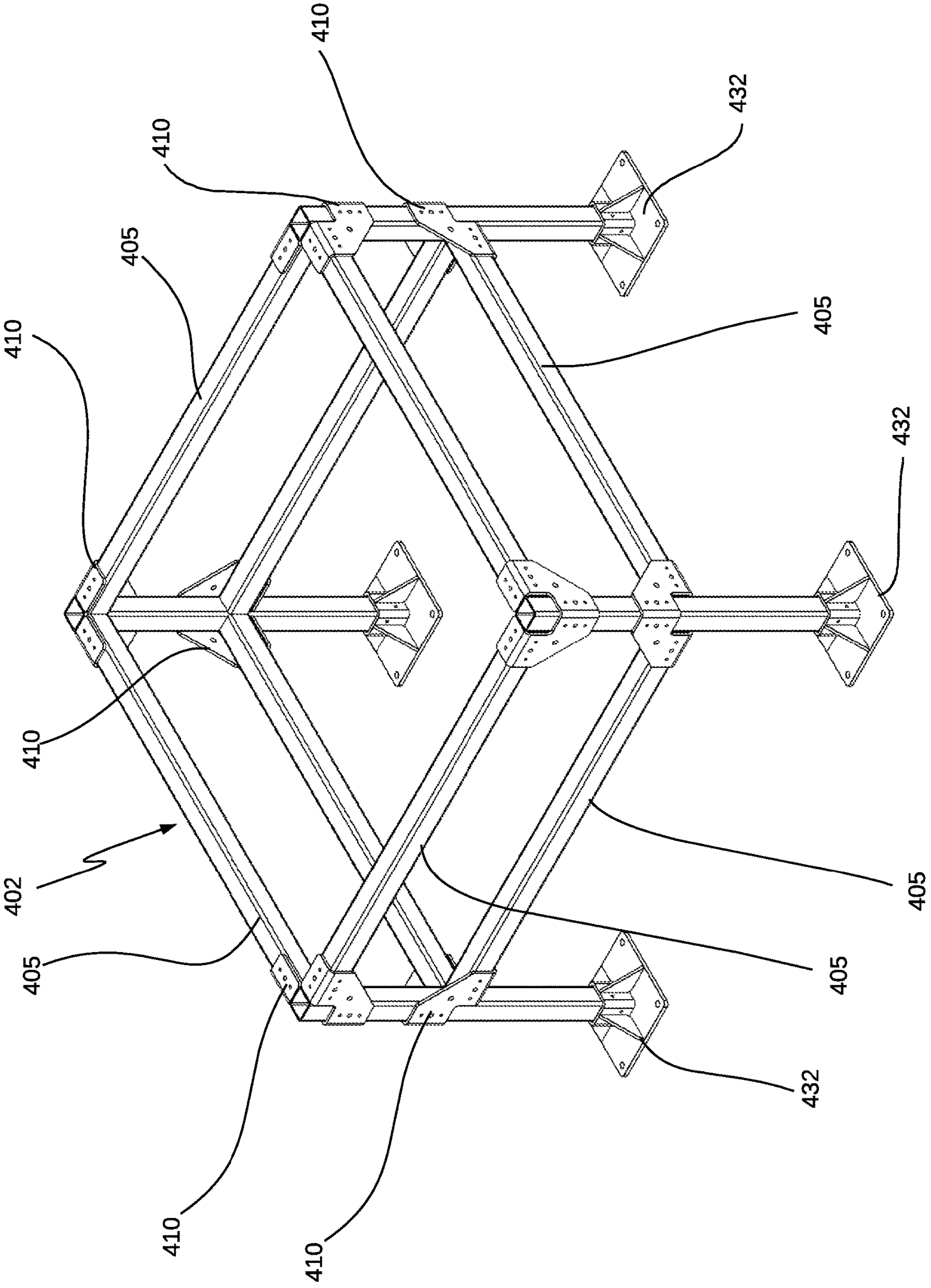
FIG. 32: is a perspective view of an illustrative structure constructed from components of a modular frame system according to a third embodiment of the present invention.

FIG. 32 shows an illustrative structure 402 that is assembled from a modular frame system according to another embodiment. The frame system includes spanning members 405, feet 432, and fasteners that are substantially similar to those of the system described and illustrated in connection with FIG. 1. The frame system also includes joiner 410, one of which is illustrated in FIG. 33.

Figure 33:
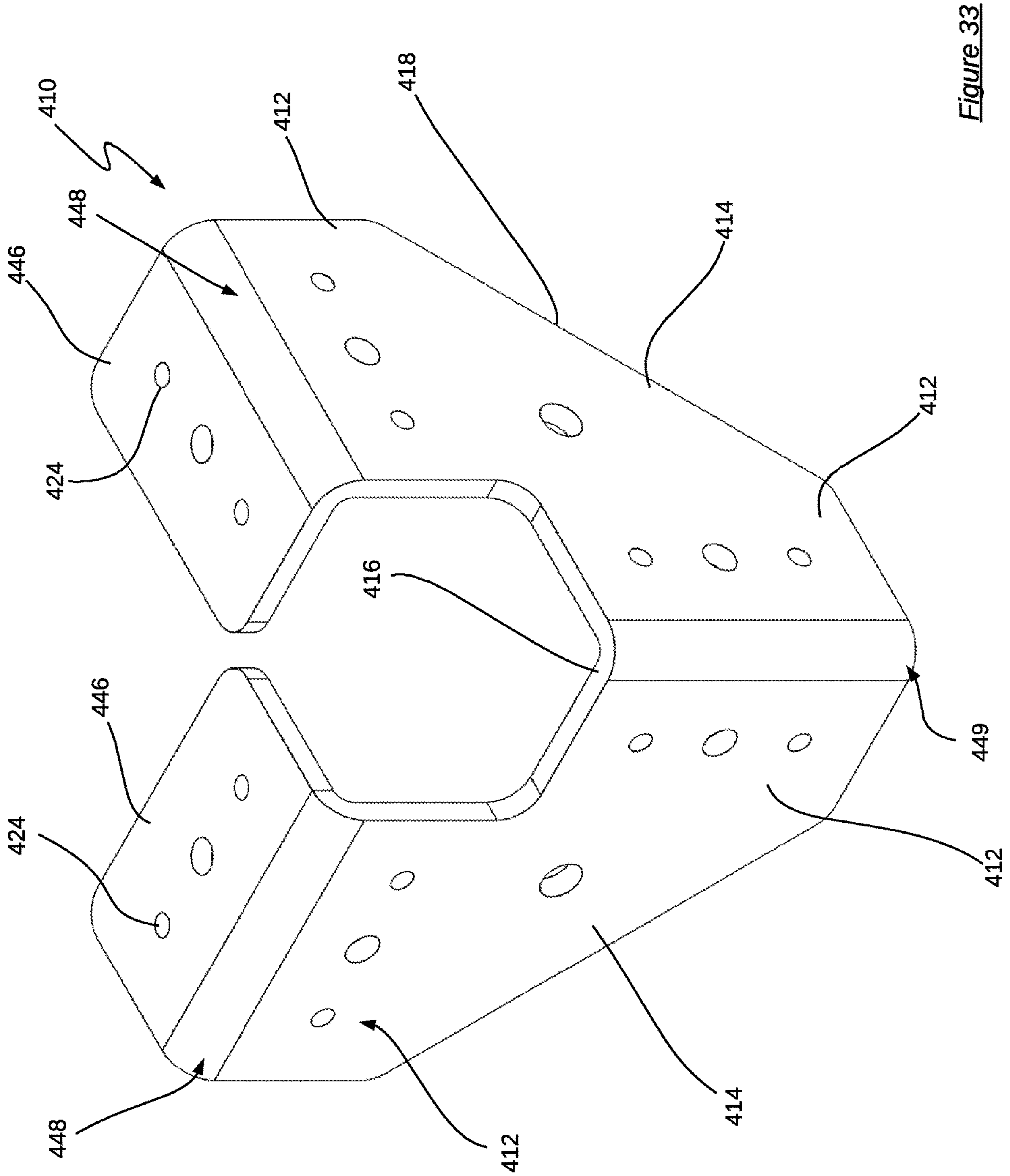
FIG. 33: is a perspective view of a joiner of the system shown in FIG. 32.

The joiner 410 has features that are similar to those of joiner 10, and in FIG. 33 those similar features are indicated with reference numerals used above in reference to the joiner 10 with an increment of 400.

The joiner 410 has four connection portions 412 and two web portions 416. The joiner 410 additionally has two outer connection portions 446, and two outer arcuate interposing web portions 448. Each outer arcuate interposing web portion 448 is contiguous with one of the connection portions 412 and one of the outer connection portions 446. The arcuate interposing web portions 448 are shaped such that the outer connection portions 446 are orthogonal to the plane of the adjacent connection portion 412 and web portion 416.

A central arcuate interposing web portion 449 is contiguous with two of the connection portions 412, and is shaped such that the two web portions 416 are in orthogonal planes. By virtue of the central and outer arcuate interposing web portions 448, 449, the two outer connection portions 446 are co-planar.

As will be evident from FIG. 32, the joiner 410 is able to be assembled within the frame structure 402 so as to be secured to three spanning members 405. Any one of those three spanning members can extend through the notional node point that is defined by the intersection of the longitudinal axes of the interconnected spanning members.

Figure 35:
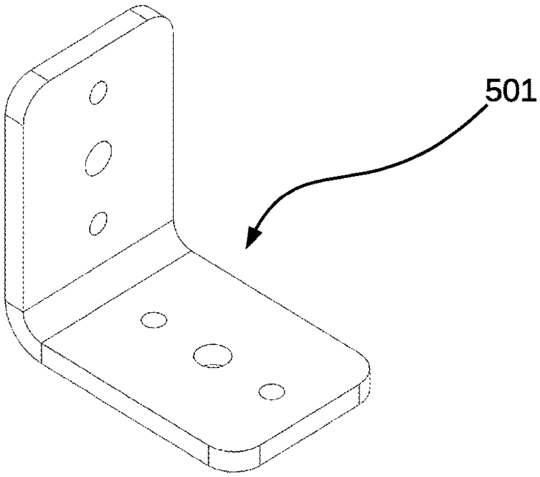
FIG. 35: is a perspective view of a right-angle connection bracket of modular frame systems according to embodiments of the present invention.
Figure 36:
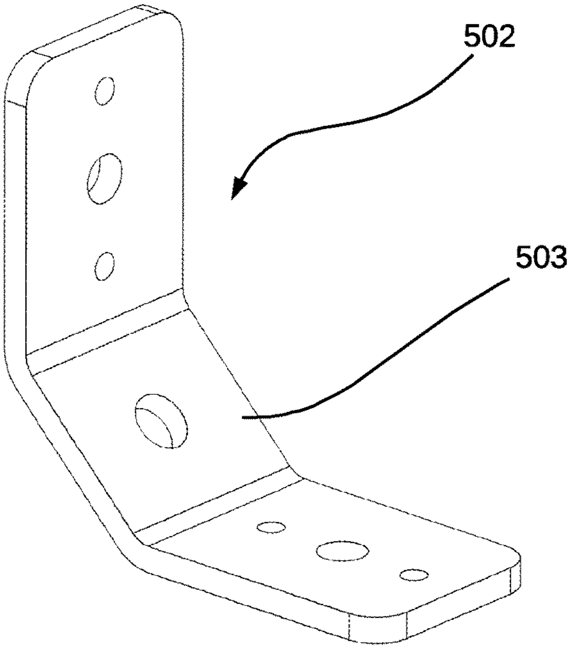
FIG. 36: is a perspective view of an internal bracing connection bracket of modular frame systems according to embodiments of the present invention.

FIGS. 35 and 36 show angle connection brackets 501, 502. The brackets 501, 502 are shaped to be secured to faces of two spanning members that are adjacent one another and have an internal angle of approximately 90°. In this way, the brackets 501, 502 are configured to interconnect to spanning members within an assembled frame structure.

Bracket 502 additionally has a bridging section 503 that has a mount to which a cross-brace is mountable.

Figure 37:
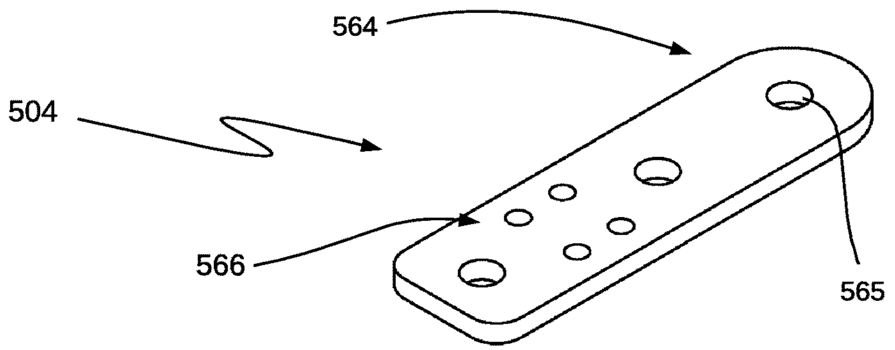
FIG. 37: is a perspective view of a cross-brace connector according to embodiments of the present invention.

FIG. 37 shows a cross-brace connector 504, which is configured to be secured to a joiner 10, and to a spanning member 5. To this end, the cross-brace connector 504 has a first end portion 564 with a mounting hole 565 for securing the cross-brace connector 504 to the web portion 14 of a joiner 10 via a fastener. The cross-brace connector 504 also has a set of through holes 566 for use in securing the spanning member 5 to the cross-brace connector 504 via fasteners.

Figure 42:
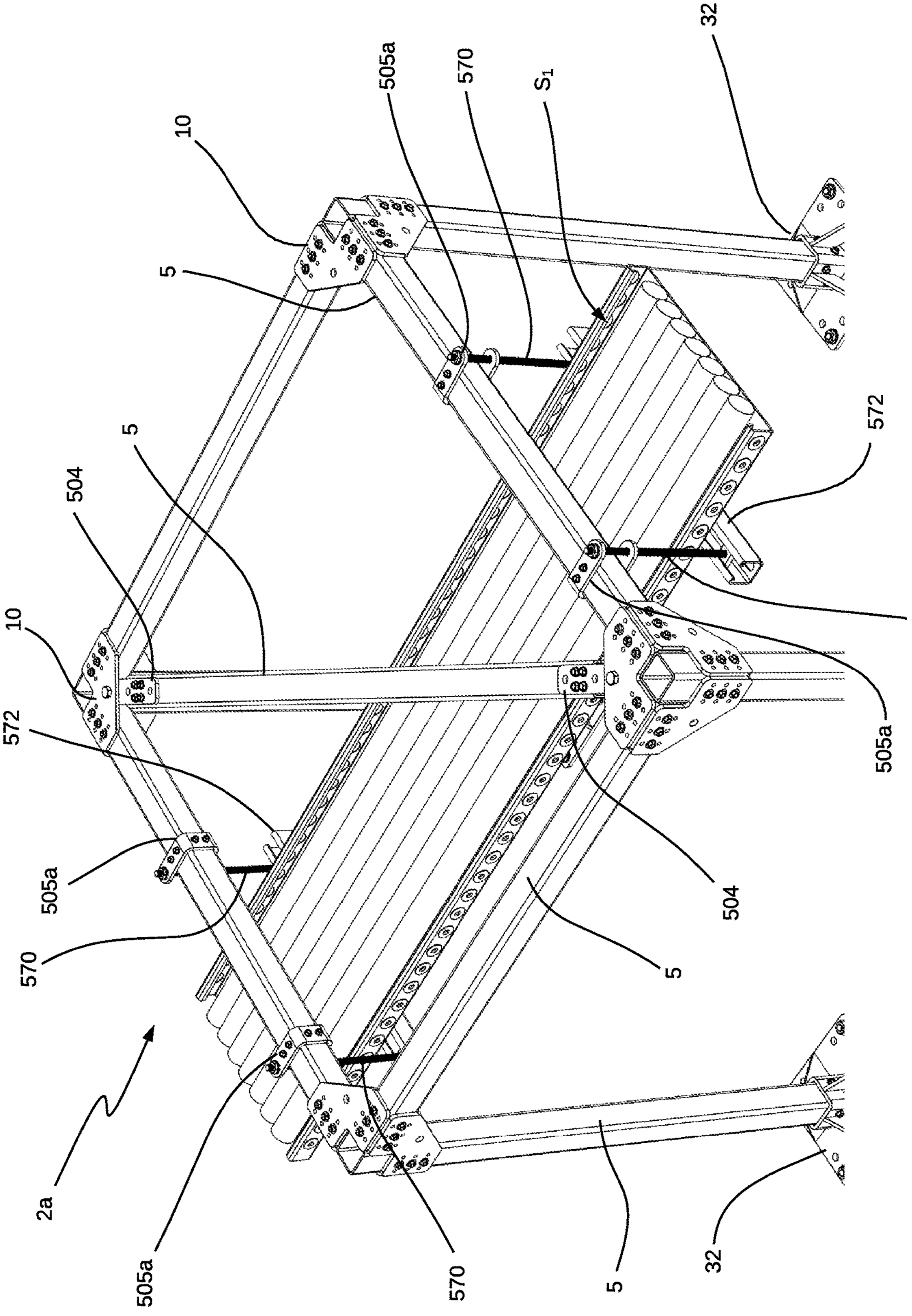
FIG. 42: is a perspective view of an illustrative structure constructed from components of the disclosed modular frame system, together with a cable tray supported by the structure.
Figure 43:
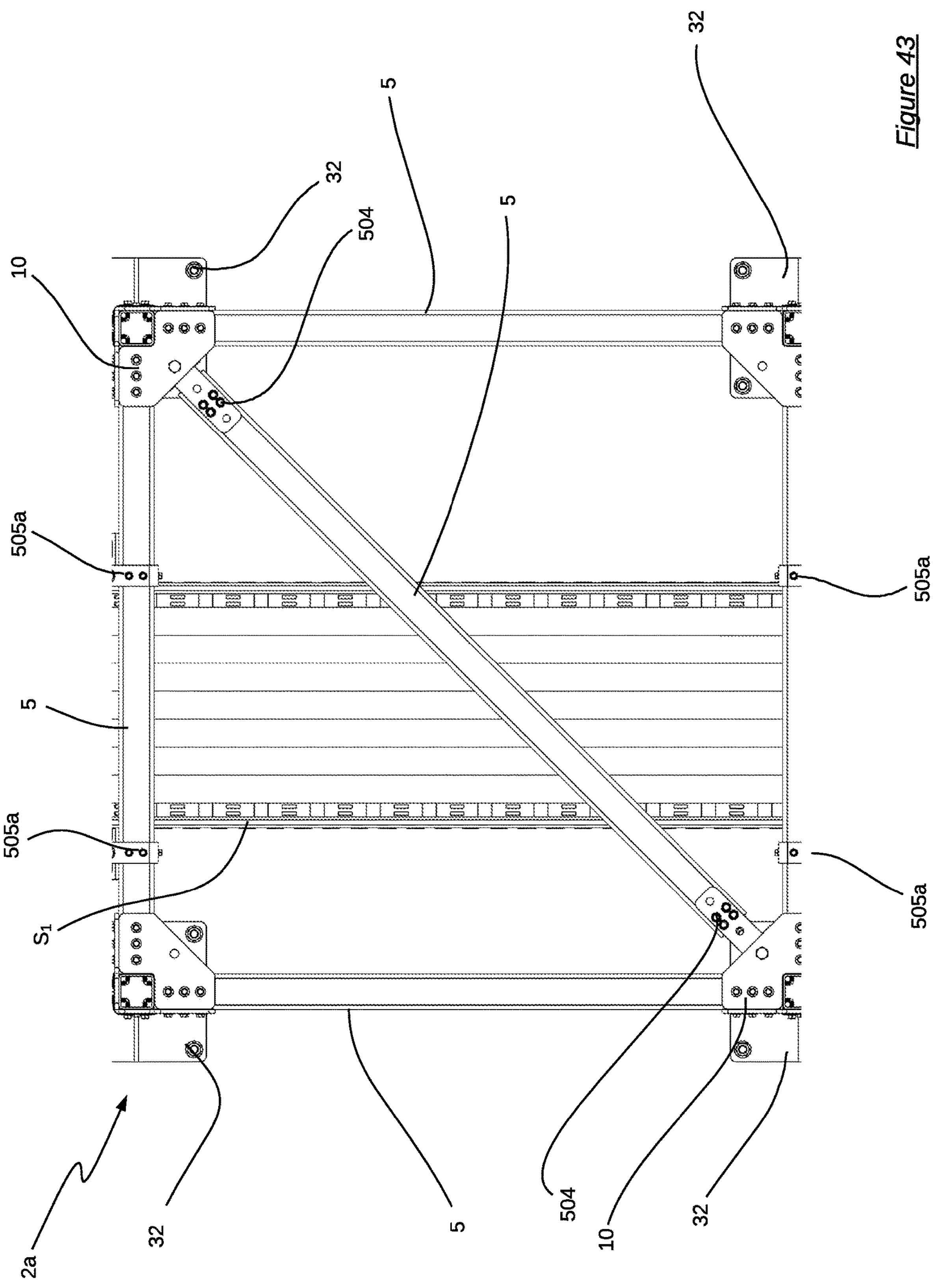
FIG. 43: is a plan view of the illustrative structure shown in FIG. 42.

FIGS. 42 and 43 show illustrative structures that each include a pair of cross-brace connectors 504 to which a spanning member 5 is attached to provide cross-bracing to the respective structure. Each of the cross-brace connectors 504 is secured to a joiner 10 by a bolt that passes through the mounting holes 28, 565, and to the cross-brace spanning member 5 via self-drilling fasteners that extend through holes 566 and into the spanning member 5.

Figure 38:
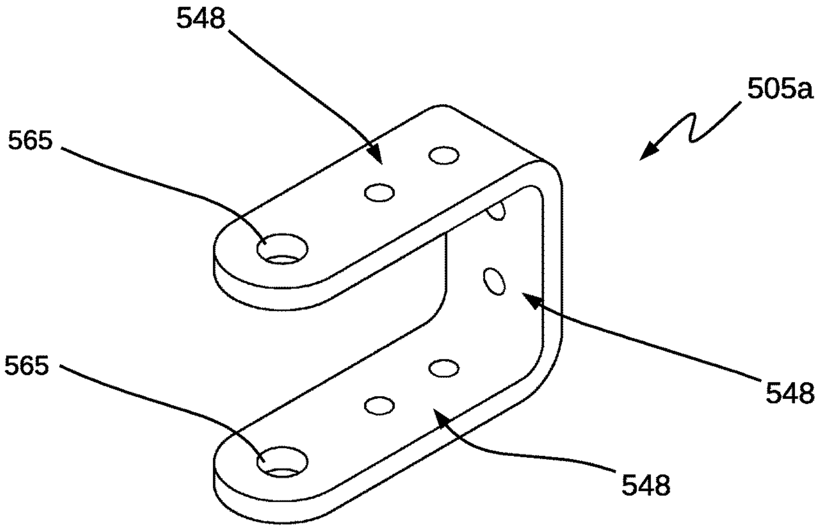
FIG. 38: is a perspective view of a first saddle connector according to embodiments of the present invention.
Figure 39:
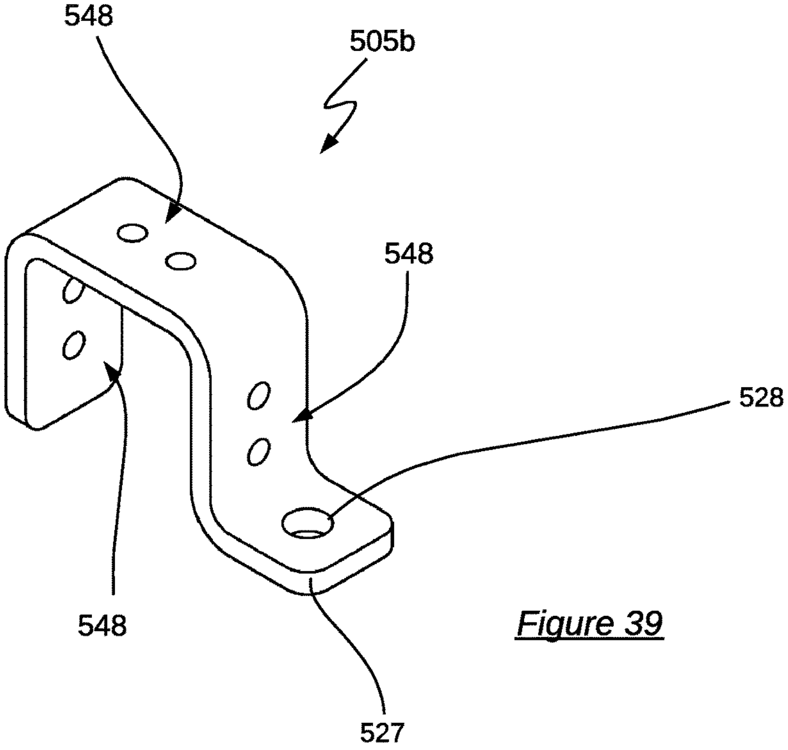
FIG. 39: is a perspective view of a second saddle connector according to embodiments of the present invention.
Figure 40:
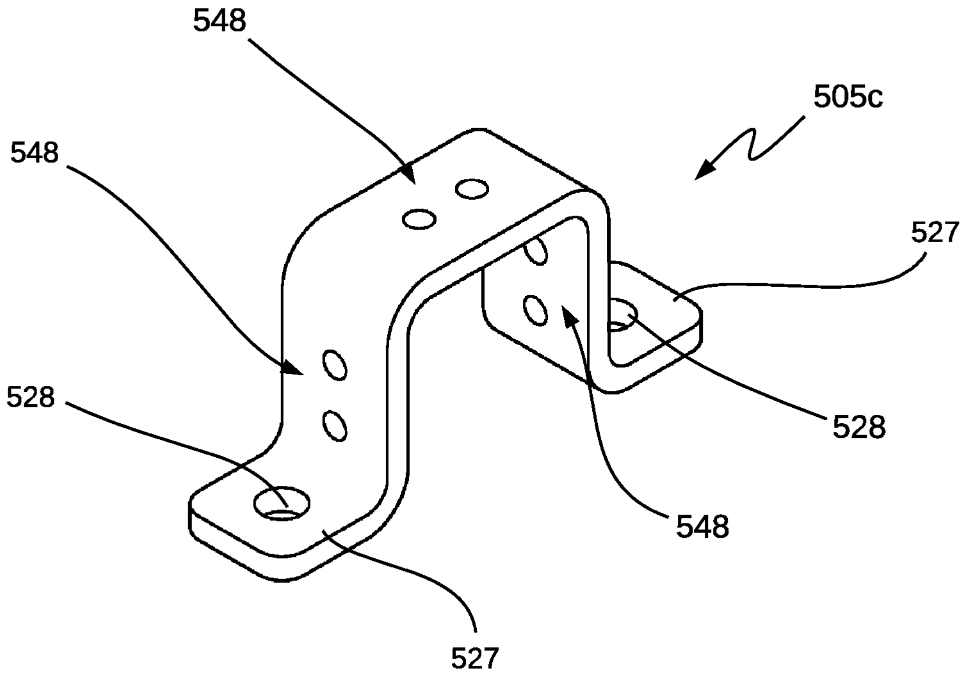
FIG. 40: is a perspective view of a third saddle connector according to embodiments of the present invention.

FIGS. 38 to 40 show saddle connectors **505*a*, 505*b*, 505*c*. Each of the 505*a*, 505*b*, 505*c* has generally C-shaped formation that has through holes 548 through which to pass fasteners 26 of the system to secure the saddle connector 505*a*, 505*b*, 505*c* to a spanning member 5. The C-shaped formation in each of the saddle connectors 505*a*, 505*b*, 505*c* is shaped to extend in a circumferential direction around a spanning member 5**.

Saddle connectors **505*a*, 505*c* similarly have generally C-shaped formations with through holes 548 through which to pass fasteners 26 of the system to secure the saddle connector to a spanning member 5. Saddle connector 505*c* has two tab formations 527 that each have a mounting hole 528 through which to pass a fastener, such as a bolt shank, threaded rod, or the like. Saddle connector 505*b* has a single tab formation 527 with a mounting hole 528. Using fasteners that extend through the mounting holes 548, a service component can be fastened to the respective saddle connector 505*a*, 505*b*, 505*c*, as is described in further detail in connection with FIGS. 42 to 45. With the respective saddle connector 505*a*, 505*b*, 505*c* secured to one of the spanning members 5** of an assembled frame structure, the service component is connected to, and supported by the assembled frame structure.

Figure 41:
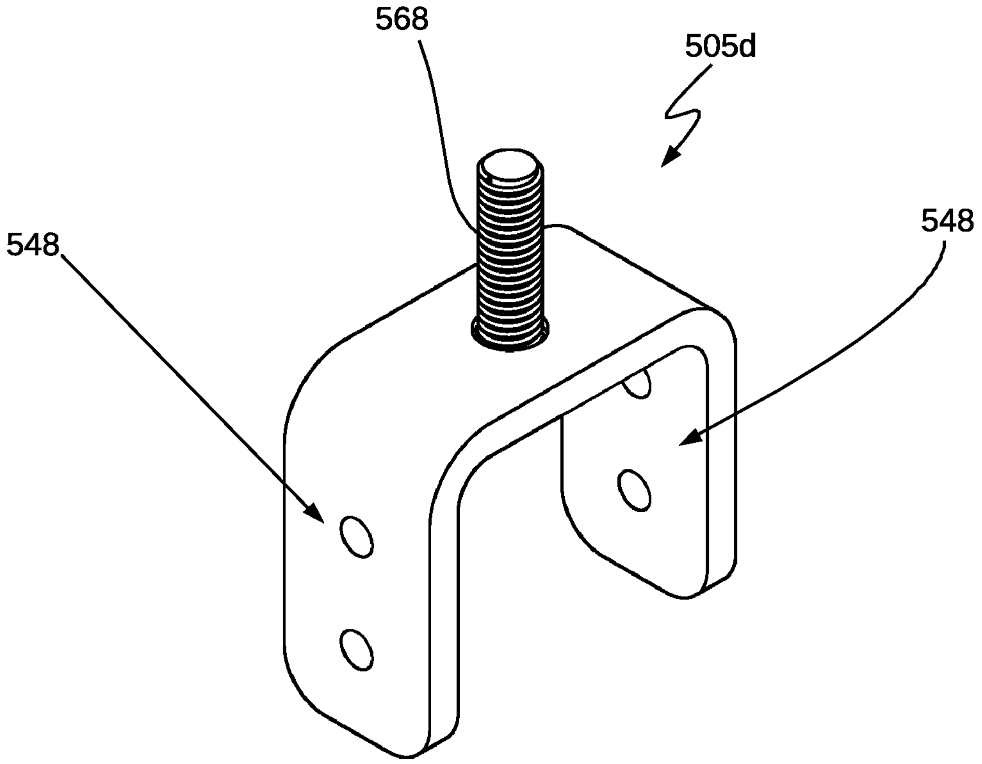
FIG. 41: is a perspective view of a fourth saddle connector according to embodiments of the present invention.

FIG. 41 shows a saddle connector **505*d*, which also has a generally C-shaped formation with through holes 548. A threaded shank 568 projects outwardly from the centre of the saddle connector 505*d*, in a direction that is opposite to the concavity of the saddle. The saddle connector 505*d* also has through holes 548 through which to pass fasteners 26 of the system to secure the saddle connector 505*a*, 505*b*, 505*c* to a spanning member 5**.

FIGS. 42 and 43 show an illustrative assembled frame structure **2*a* that is assembled using feet 32, spanning members 5 and joiners 10, as previously described. The structure 2*a* includes a cross-brace that is assembled with a pair of cross-brace connectors 504 and spanning member 5**.

The assembled frame structure **2*a* supports a cable tray $S_1$ in which a set of cables are laid. To this end, the structure 2*a* has a pair of trapeze subassemblies. Each trapeze subassemblies has a pair of saddle connectors 505*a* that are secured to one of the spanning members 5 using self-drilling screws. A length of threaded rod 570 is connected to the through holes 548 of saddle connectors 505*a*. A length of strut channel 572 extends transversely between the lower ends of the threaded rods 570 using strut nuts to form the connection. The cable tray $S_1$ is supported on top of the length of strut channel 572**, and may be secured thereto with fasteners.

Figure 44:
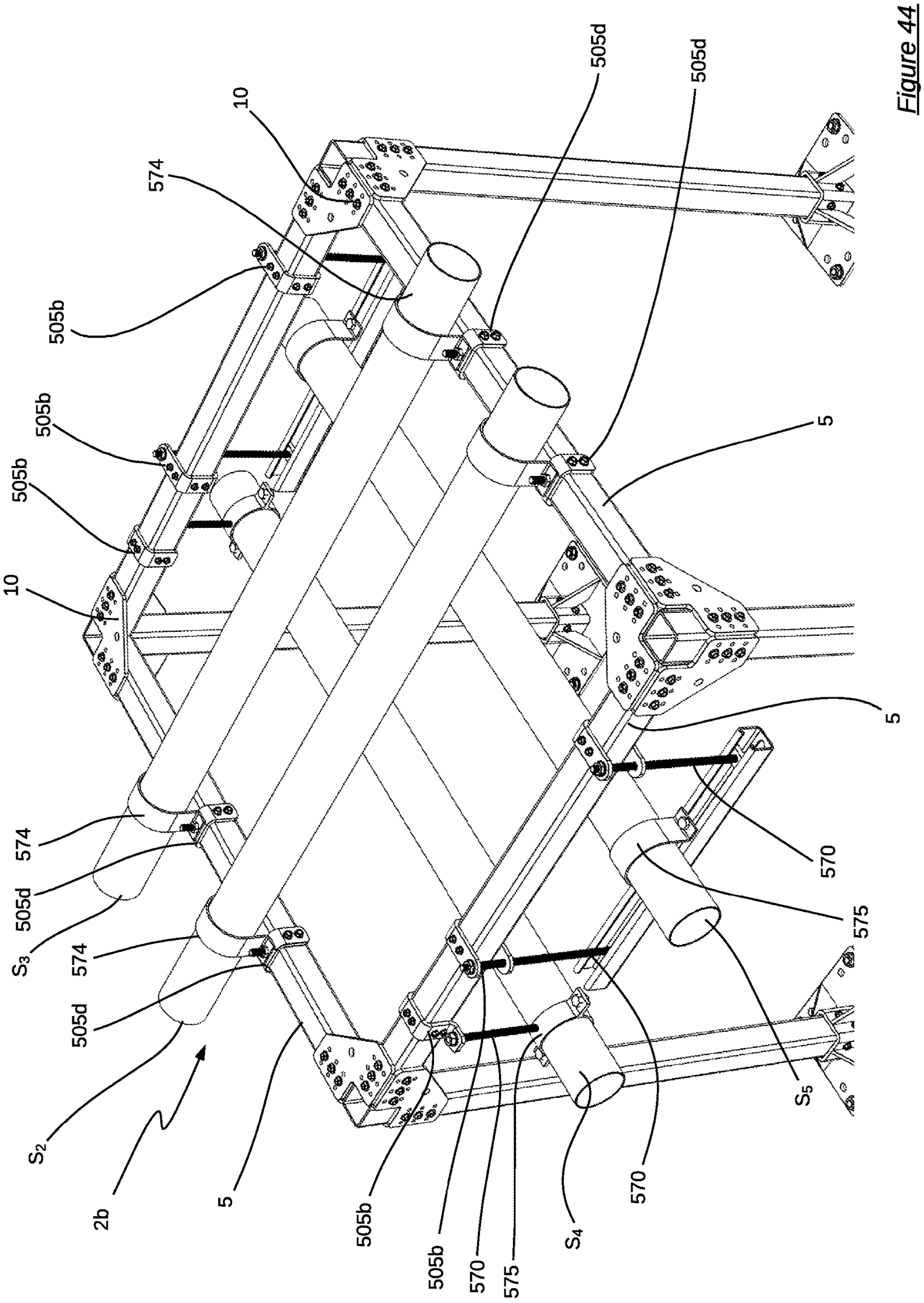
FIG. 44: is a perspective view of an illustrative structure constructed from components of the disclosed modular frame system, together with sections of pipe supported by the structure.

FIG. 44 show an illustrative assembled frame structure **2*b* that is also assembled using feet 32, spanning members 5 and joiners 10, as previously described. The structure 2*b* supports four pipes $S_2$, $S_3$, $S_4$, $S_5$. For illustrative purposes, three different supporting styles are illustrated. Pipes $S_2$, $S_3$ are supported from underneath by spanning members 5 of the structure 2***b*, and restrained to the spanning members 5 using saddle connectors 505*d* with pipe saddles 574, with nuts securing the pipe saddles 574 to the threaded shanks 568.

Pipe $S_4$ by supported on lengths of strut channel 572 that are parts of suspended trapeze subassemblies of similar form to the trapeze subassemblies shown in FIG. 42. The trapeze subassemblies are connected to the spanning members 5 using saddle connectors 505*b*. A pipe saddle 574 restrains the pipe $S_4$ on the strut channels.

Pipe $S_5$ is suspended from the structure 2*b* by pipe clamps 575 and threaded rod 570, and saddle connectors 505*b*.

Figure 45:
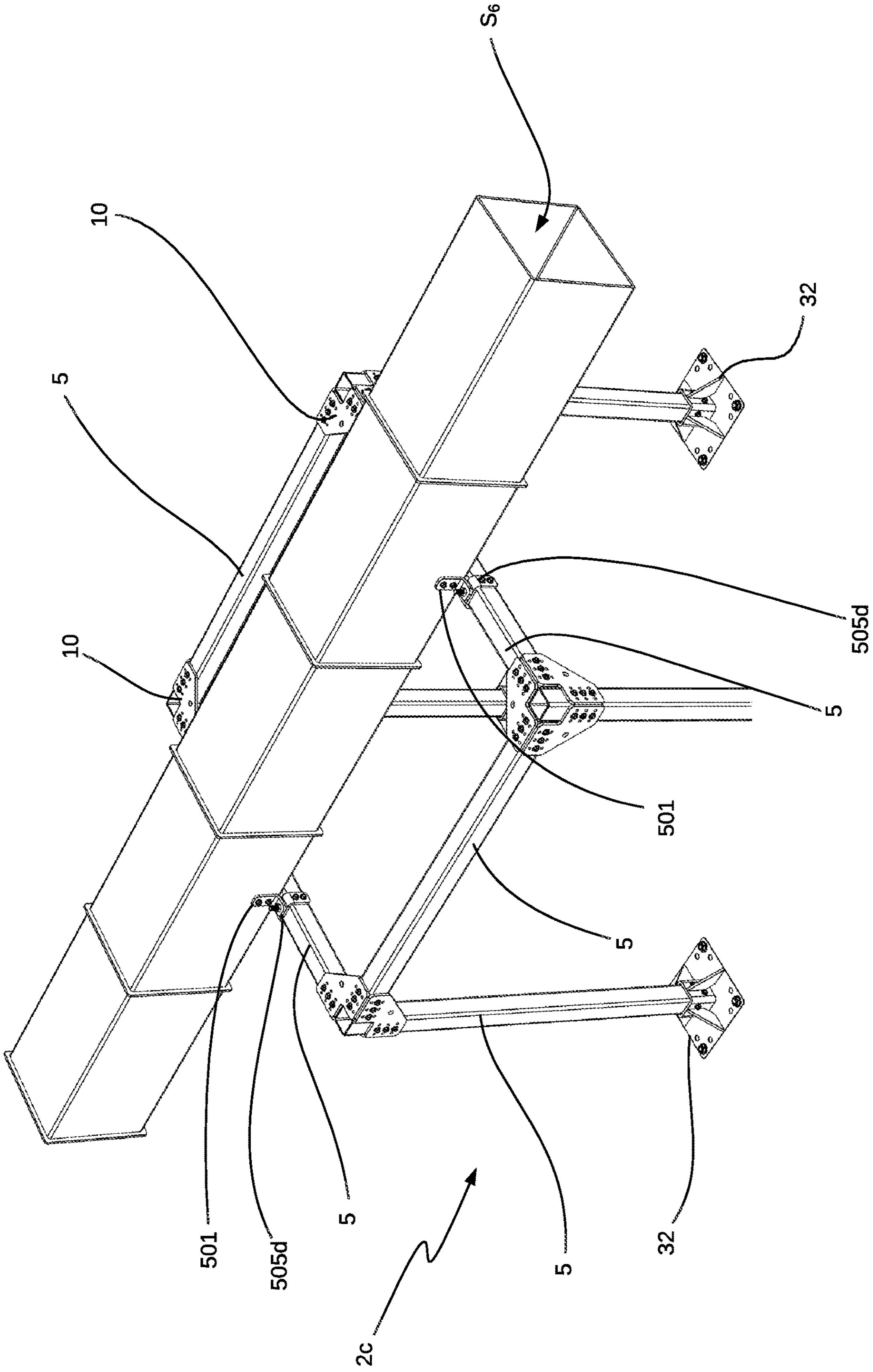
FIG. 45: is a perspective view of an illustrative structure constructed from components of the disclosed modular frame system, together with a length of HVAC duct supported by the structure.

FIG. 45 shows an illustrative assembled frame structure 2*c* that is also assembled using feet 32, spanning members 5 and joiners 10, as previously described. The structure 2*b* supports HVAC duct $S_6$ from underneath by spanning members 5 of the structure 2*c*. The HVAC duct $S_6$ is restrained to the spanning members 5 using saddle connectors 505*d* and angle connection brackets 501.

Figure 47:
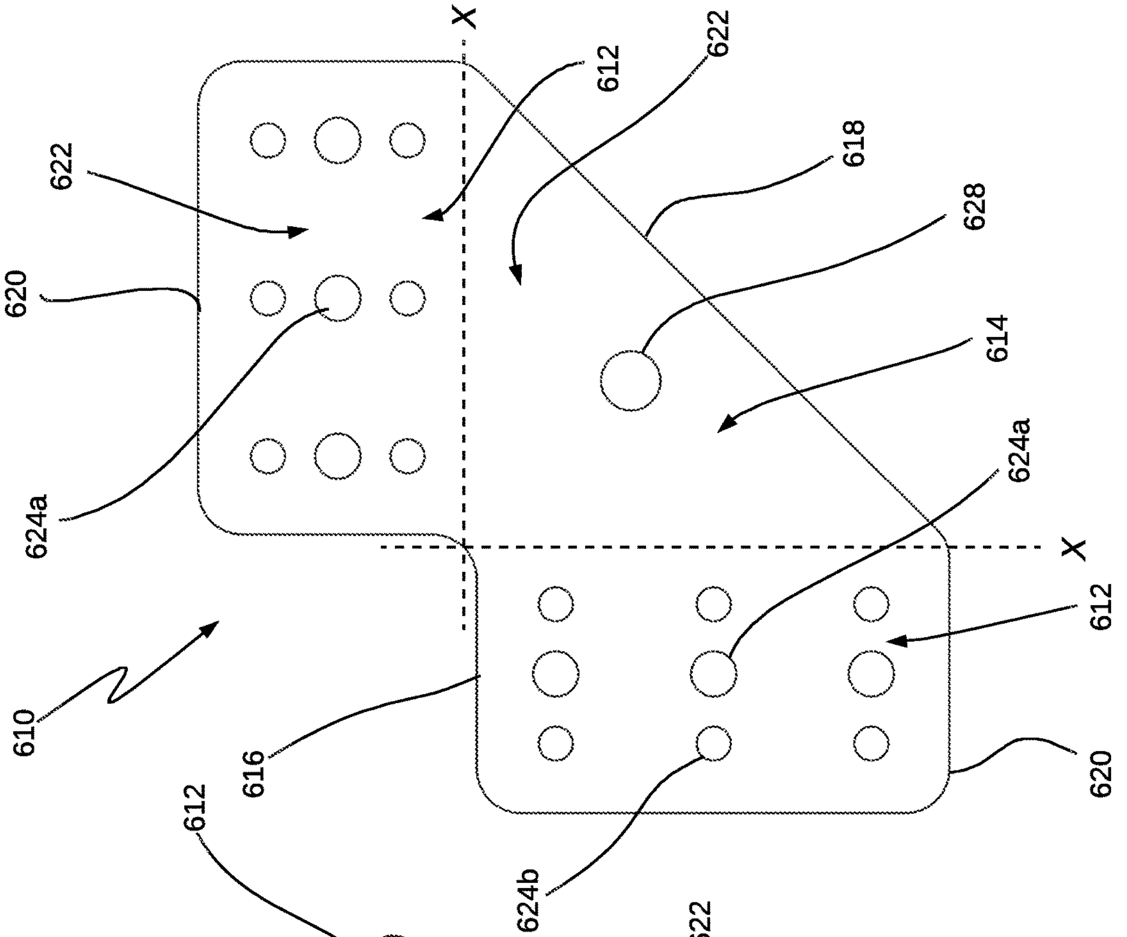
FIG. 47: is a plan view of the joiner of FIG. 46.
Figure 46:
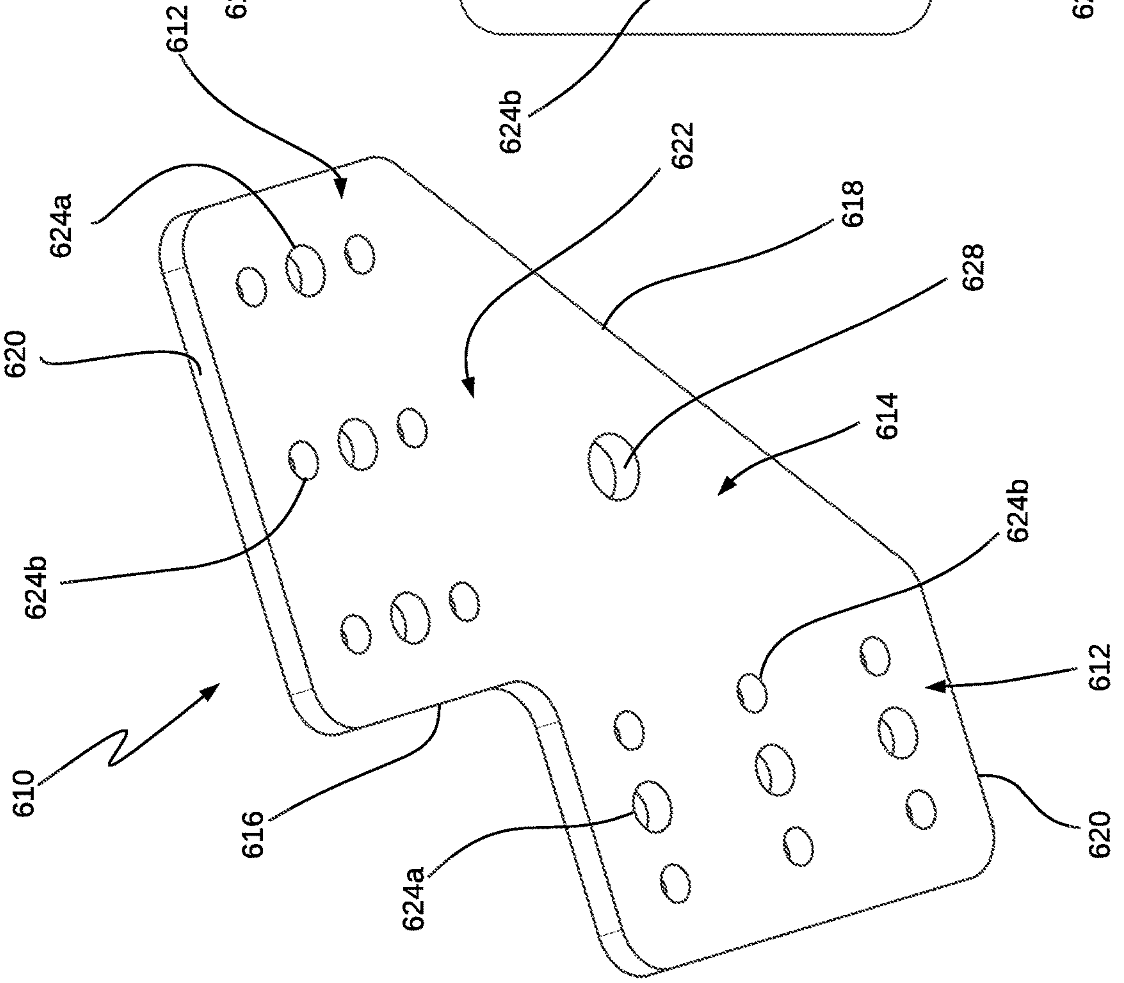
FIG. 46: is a perspective view of a joiner of a modular frame system in accordance with a further embodiment of the present invention.

FIGS. 46 and 47 show a joiner 610 of another embodiment. The joiner 610 is suitable for inclusion and use within the modular framing system from which the structure 2 of FIG. 1 is assembled. Parts of the joiner 610 that are the same or similar to parts of the joiner 10 have the same reference numbers with the prefix "6" and for succinctness, will not be described again.

The joiner 610 has two connection portions 612, and a web portion 614 that interconnects the adjacent pair of connection portions 612. Further, the web portion 614 spaces the adjacent pair of connection portions 612. The web portion 614 interposes the pair of the connection portions 612. Each connection portion 612 is contiguous with the web portion 614.

As will be apparent from the Figures and the description that follows, the joiner 610 is suitable for being secured to two spanning members 5 within a modular frame system.

The joiner 610 has a first major edge 616, and a second major edge 618. As discussed in further detail below, the first major edge 616 has a locating portion that is shaped to complement at least part of the cross-sectional profile of one of the spanning members 5. In other words, the locating portion of the first major edge 616 is shaped to complement at least a segment of the cross-sectional shape of the external outer surface 9 in directions transverse to the length direction of the spanning members. Two minor lateral edges 620 each extend between the first and second major edges 616, 618.

The joiner 610 of this embodiment has a plate-like formation. The two major faces 622 (one of which is shown in FIGS. 46 and 47) of the joiner 610 are planar, and parallel to one another.

Each connection portion 612 of the joiner 610 has nine through holes through which to pass fasteners to secure the joiner 610 to a respective one of the spanning members 5. In the example of FIGS. 46 and 47, each of the two connection portions 12 of the joiner has a first set of through holes 624*a*, and two sets of through holes 624*b*. In this example, there are three through holes 624*a* in the first set. Further, there are also three through holes 624*b* in each of the two sets. As shown in the Figures, the diameter of through holes 624*a* is slightly larger than that of through holes 624*b*.

In this particular example, through holes 624*a* are intended for use with bolts that pass through the joiner 610 and also through the spanning member 5. Through holes 624*a* are intended for use with self-drilling screws that pass through the joiner 610 and through the wall of the spanning member 5. It will be appreciated that in some other embodiments, the number of holes the sets of through holes may differ from that shown in FIGS. 46 and 47.

It will be appreciated that the modular frame system described above provides significant flexibility to interchange supporting styles and/or components for various services. The support styles/components used in any particular instance will depend on a number of factors. These factors may include regulatory considerations, access to the service (before, during and after installation), engineering requirements, and/or others.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A modular framing system comprising:

a plurality of spanning members, at least some of which are hollow and have a predetermined nominal wall thickness;

fasteners; and a plurality of joiners that are each securable to two or more of the hollow spanning members, each joiner having:

two or more connection portions, each connection portion having two or more through holes through which to pass one of the fasteners when securing the joiner to one of the spanning members, at least one web portion that interconnects an adjacent pair of the connection portions, the web portion being configured to space the respective adjacent pair of connection portions, and such that spanning members secured to the adjacent pair of connection portions are non-parallel and lie in a common plane, and a minimum thickness that is greater than the predetermined nominal wall thickness of the hollow spanning members, each interconnection of two or more spanning members to the respective joiner defines a notional node point, and the joiner is shaped to accommodate one of the spanning members extending through the notional node point in any of the three non-parallel directions in assembled frame structures, wherein frame structures are assemblable from the modular framing system, each frame structure being formed of spanning members that are interconnected by securing the joiners to the spanning members, with each fastener passing through a respective one of the through holes in the connection portions of one of the joiners and engaging the respective spanning member to thereby form the interconnection, and with the joiners interconnected with connection portions against a lateral external surfaces of the spanning members in an assembled frame structure, wherein at least some of the spanning members have an external outer surface that includes two adjacent planar faces, and a chamfer that interposes the two adjacent planar faces, and wherein each joiner has a first major edge and a second major edge, the first major edge defining a locating portion that has a non-planar surface with two or more sections in which normals to the surface are convergent, the locating portion being a shape complement of the two adjacent planar faces and chamfer of a respective one of the spanning members.

2. The modular framing system of claim 1, wherein each of the joiners is formed such that each web portion interposes an adjacent pair of the connection portions, and wherein each connection portion in that pair is contiguous with the respective web portion.

3. The modular framing system of claim 2, wherein each of connection portions that is part of a pair of connection portions that are contiguous with an interposing web portion defines a planar mounting face, and the planar mounting faces in that pair of connection portions are co-planar.

4. The modular framing system of claim 3, wherein the interposing web portion has a substantially planar surface, and the joiner is formed such that, for each pair of connection portions and the corresponding interposing web portion, the planar mounting faces and the substantially planar surface all lie in a common plane.

5. The modular framing system of claim 1, wherein the plurality of joiners includes a set of first joiners, that each have two connection portions and one web portion, and whereby, in assembled frame structures that incorporate a respective one of the first joiners, spanning members secured to the respective first joiner project outwardly away from the respective first joiner in up to two directions.

6. The modular framing system of claim 5, wherein the plurality of joiners includes a set of second joiners, that each have three connection portions and two web portions, and whereby, in assembled frame structures that incorporate a respective one of the second joiners, spanning members secured to the respective second joiner project outwardly away from the respective second joiner in up to three directions.

7. The modular framing system of claim 5, wherein:

the plurality of joiners includes a set of second joiners, each of the second joiners having:

three connection portions and two web portions, and a first major edge and a second major edge, the first major edge including a locating portion that includes a concave recess within which to receive at least a segment of the external periphery of the cross-sectional profile of one of the spanning members, whereby, in assembled frame structures that incorporate a respective one of the second joiners, spanning members secured to the respective second joiner project outwardly away from the respective second joiner in up to three directions.

8. The modular framing system of claim 6, wherein the second joiners are configured such that, in assembled frame structures a respective one of the second joiners, two spanning members secured to two of the three connection portions project outwardly away from the respective second joiner in substantially parallel and co-axial directions.

9. The modular framing system of claim 1, further comprising one or more cross-braces, wherein:

the web portions of at least some of the joiners include a mounting hole, and in assembled frame structures that incorporate a respective one of the cross-braces, end regions of the respective cross-brace are mounted to a pair of joiners via the mounting holes.

10. The modular framing system of claim 9, wherein each joiner is configured such that each cross-brace is to project away from the respective joiner at an oblique angle to spanning members that are secured to the respective joiner.

11. The modular framing system of claim 9, wherein the mounting of an end region of a respective one of the cross-braces to a respective joiner facilitates adjustment of the position of the respective end of the cross-brace relative to the mounting hole.

12. The modular framing system of claim 1, wherein at least some of the joiners are each formed of material having a constant thickness.

13. The modular framing system of claim 1, wherein the ratio of the minimum thickness of the joiners to the predetermined nominal wall thickness is at least 1.5:1.

14. The modular framing system of claim 1, further comprising a plurality of feet for connecting frame structures assembled from the system to a supporting structure, each foot including:

a base plate with a primary face that is to face towards the supporting structure to which that foot is connected, and a mating portion that is attached to the base plate on the opposing face of the base plate to the primary face, wherein the mating portion is configured to mate with an end portion of one of the spanning members, such that the mated spanning member projects away from the base plate in a direction that is substantially opposite to the primary face.

15. The modular framing system of claim 14, wherein the mating portion includes one or more through holes through which to pass a fastener to secure the foot and mated spanning member to one another.

16. The modular framing system of claim 14, wherein the mating portion is a sleeve formation that is shaped to receive an end portion of one of the spanning members.

17. The modular framing system of claim 16, wherein each foot further comprises one or more gussets that are each attached to the external surface of the sleeve formation and the opposing face of the base plate.

18. The modular framing system of claim 1, wherein each of the fasteners has a shank with an external thread, and a tip with a self-drilling formation, such that each of the fasteners is configured to form a hole in the spanning members during installation.

* * * * *